(12) United States Patent
Endo et al.

(10) Patent No.: US 8,019,535 B2
(45) Date of Patent: Sep. 13, 2011

(54) TRAFFIC INFORMATION COLLECTING SYSTEM FOR NAVIGATION DEVICE

(75) Inventors: Yoshinori Endo, Kanagawa (JP); Shinichi Amaya, Kanagawa (JP)

(73) Assignee: Xanavi Informatics Corporation, Zama-shi (JP)

( * ) Notice: Subject to any disclaimer, the term of this patent is extended or adjusted under 35 U.S.C. 154(b) by 732 days.

(21) Appl. No.: 10/593,769

(22) PCT Filed: Mar. 18, 2005

(86) PCT No.: PCT/JP2005/004965
§ 371 (c)(1),
(2), (4) Date: Sep. 22, 2006

(87) PCT Pub. No.: WO2005/093688
PCT Pub. Date: Oct. 6, 2005

(65) Prior Publication Data
US 2007/0198176 A1 Aug. 23, 2007

(30) Foreign Application Priority Data
Mar. 25, 2004 (JP) ................. 2004-088781

(51) Int. Cl.
*G08G 1/00* (2006.01)
(52) U.S. Cl. ............. 701/207; 701/117; 340/995.13; 340/995.12; 707/751; 707/758; 707/781; 369/47.1
(58) Field of Classification Search ............ 701/207, 701/200, 209, 214, 202, 201, 117; 340/991, 340/995.1, 995.13, 995.12; 709/219, 216; 348/211.3; 455/422.1, 414.3; 707/751, 758, 707/781; 369/47.1; *G08G 1/00*
See application file for complete search history.

(56) References Cited

U.S. PATENT DOCUMENTS

| | | | | |
|---|---|---|---|---|
| 6,169,515 B1 * | 1/2001 | Mannings et al. | ....... | 342/357.31 |
| 6,359,571 B1 | 3/2002 | Endo et al. | | |
| 6,453,230 B1 * | 9/2002 | Geurts | .......... | 701/117 |
| 6,591,188 B1 * | 7/2003 | Ohler | .......... | 701/209 |
| 6,636,805 B1 * | 10/2003 | Tada et al. | .......... | 701/209 |
| 6,662,105 B1 * | 12/2003 | Tada et al. | .......... | 701/209 |
| 6,768,942 B1 * | 7/2004 | Chojnacki | .......... | 701/200 |
| 6,859,720 B2 * | 2/2005 | Satoh et al. | .......... | 701/117 |

(Continued)

FOREIGN PATENT DOCUMENTS

JP 2000-123289 4/2000

(Continued)

OTHER PUBLICATIONS

Taylor, K.B., "TrayTek—Information and services center", Publication Year: 1991, vol. 2, pp. 763-774.*

(Continued)

*Primary Examiner* — Tuan C To
(74) *Attorney, Agent, or Firm* — Crowell & Moring LLP

(57) ABSTRACT

An information center (5000) for collecting traffic information stores in its memory device the latest map data. Then, it is determined through a terminal device (5030) whether or not history information has been recorded in a data recording medium (800) mounted in a navigation device (1000), and when it is determined that the history information has been recorded, the map data in the data recording medium are updated to the latest map data. The data recording medium (800) is removable from the navigation device (1000). Statistical traffic information may be updated along with the updating of the map data. Further, when history information is directly uploaded to the information center, an identifier is attached to the uploaded information.

6 Claims, 16 Drawing Sheets

U.S. PATENT DOCUMENTS

| | | | |
|---|---|---|---|
| 6,885,938 B2 * | 4/2005 | Machii et al. | 701/208 |
| 2001/0029425 A1 * | 10/2001 | Myr | 701/200 |
| 2001/0037305 A1 * | 11/2001 | Mochizuki | 705/52 |
| 2002/0094825 A1 | 7/2002 | Endo et al. | |
| 2003/0033077 A1 * | 2/2003 | Watanabe | 701/117 |
| 2003/0125866 A1 * | 7/2003 | Mori et al. | 701/117 |
| 2003/0236617 A1 * | 12/2003 | Yamada et al. | 701/209 |
| 2004/0044468 A1 * | 3/2004 | Adachi | 701/208 |
| 2004/0044470 A1 * | 3/2004 | Matsuoka et al. | 701/209 |
| 2004/0044472 A1 * | 3/2004 | Tsuge et al. | 701/210 |
| 2004/0067752 A1 * | 4/2004 | Himmelstein | 455/422.1 |
| 2004/0068364 A1 * | 4/2004 | Zhao et al. | 701/201 |
| 2004/0148099 A1 * | 7/2004 | Kim | 701/209 |
| 2004/0204843 A1 | 10/2004 | Hayama et al. | |

FOREIGN PATENT DOCUMENTS

| | | |
|---|---|---|
| JP | 2000-193474 | 7/2000 |
| JP | 2000-258176 | 9/2000 |
| JP | 2002-132909 | 5/2002 |
| JP | 2002-342330 | 11/2002 |
| JP | 2003-130650 | 5/2003 |
| JP | 2003-194562 | 7/2003 |
| JP | 2003-279358 | 10/2003 |

OTHER PUBLICATIONS

Chi-Hong Ho, Tay-Lin Hwang, "Modeling real-time dynamic queue length for urban traffic control systems", Publication Year: 1994, pp. 438-442.*

* cited by examiner

DRIVE HISTORY INFORMATION EVERY PREDETERMINED PERIOD OF TIME (EVERY PREDETERMINED DISTANCE)

| MEASURED DATE AND TIME | POSITION | LINK ID | VEHICLE INFORMATION |
|---|---|---|---|
| *** | *** | *** | *** |
| *** | *** | *** | *** |
| ⋮ | ⋮ | ⋮ | ⋮ |

33111, 33112, 33113, 33114

DRIVE HISTORY INFORMATION EVERY TIME GOING OVER A LINK

| LINK ENTERING DATE AND TIME | LINK TRAVEL TIME | LINK ID | VEHICLE INFORMATION |
|---|---|---|---|
| *** | *** | *** | *** |
| *** | *** | *** | *** |
| ⋮ | ⋮ | ⋮ | ⋮ |

33121, 33124, 33122, 33123

STATISTICAL TRAFFIC INFORMATION DB CREATING PROCESS

INFORMATION CLASSIFYING PROCESS

FIG. 20

HISTORY INFORMATION TO BE SENT

| MEASURED DATE AND TIME (33111a) | POSITION (33112a) | LINK ID (33113a) |
|---|---|---|
| *** | *** | *** |
| *** | *** | *** |
| ⋮ | ⋮ | ⋮ |

FIG. 21

DRIVE HISTORY INFORMATION EVERY PREDETERMINED PERIOD OF TIME (PREDETERMINED DISTANCE)

| MEASURED DATE AND TIME (33111) | POSITION (33112) | LINK ID (33113) | VEHICLE INFORMATION (33114) | IDENTIFIER (33115) |
|---|---|---|---|---|
| *** | *** | *** | *** | ON |
| *** | *** | *** | *** | ON |
| ⋮ | ⋮ | ⋮ | ⋮ | ⋮ |

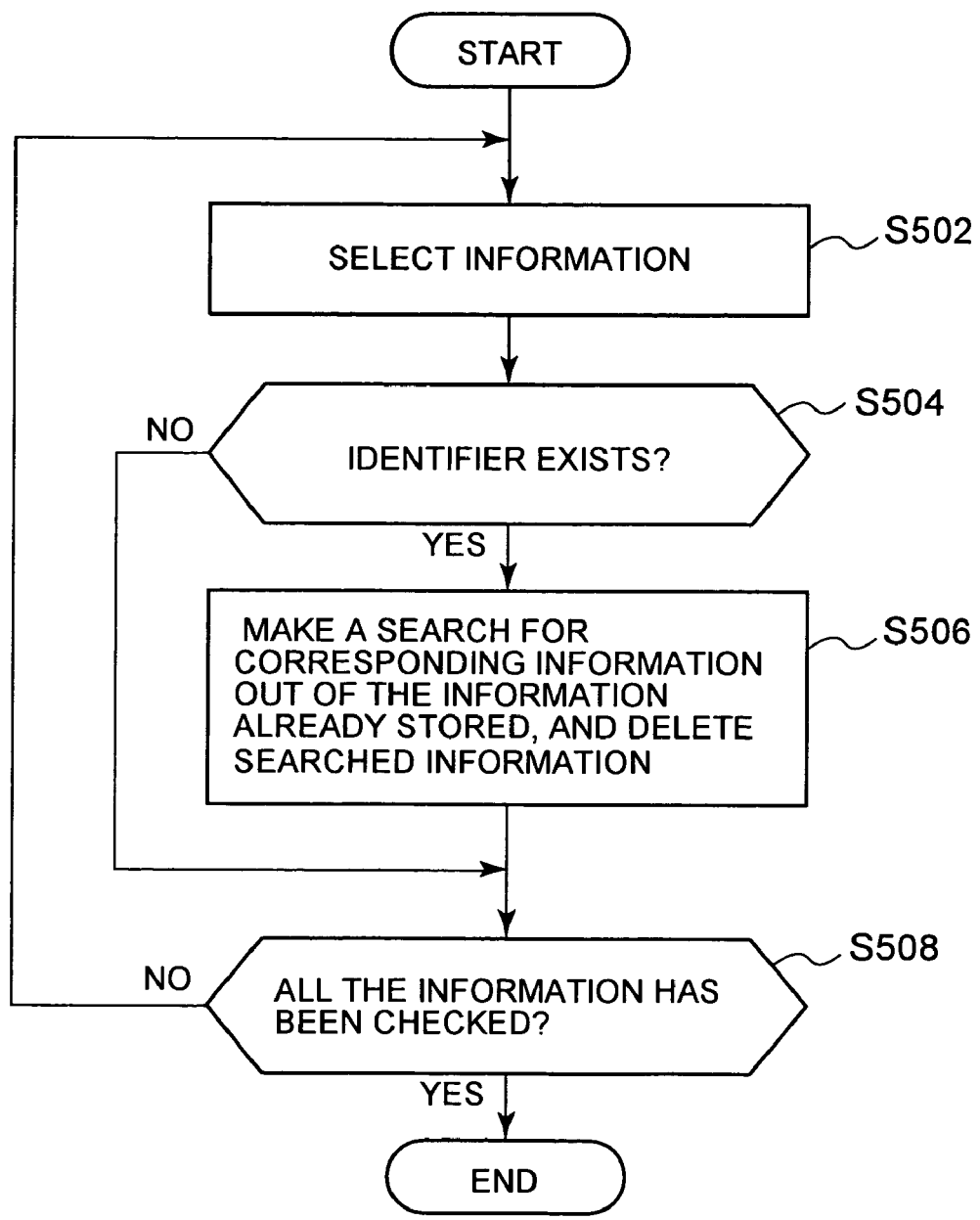

TRAFFIC INFORMATION COLLECTING SYSTEM FOR NAVIGATION DEVICE

TECHNICAL FIELD

The present invention relates to a traffic information collecting method, and more particularly, it relates to a technique to collect traffic information such as a drive history of a vehicle on which an in-vehicle type navigation device is mounted.

BACKGROUND ART

Patent Document 1 discloses a traffic information collecting system in which an information center receives information regarding driving conditions, such as traffic jam information and road surface information, having been collected by a vehicle (probe car).
Patent Document 1: Japanese Patent Laid-Open Publication No. 2000-123289

SUMMARY OF THE INVENTION

Problems to be Solved by the Invention

Even if the technique as disclosed by the Patent Document 1 is applied to each individual user's vehicle so as to collect drive history, each user does not necessarily provide the drive history information to the information center in a positive manner. Drive history information of a vehicle is significant for the information center that collects traffic information. However, for each individual, an advantage to provide the history information is not clearly defined. Therefore, it is not easy to collect history information of individual users by using the technique as disclosed by the Patent Document 1.

The present invention has been made in view of the above situations, and an object of the present invention is to provide a technique to easily collect traffic information such as drive histories of individual users.

Means for Solving the Problems

In order to solve the above problems, a traffic information collecting method according to the present invention updates map data, upon receipt of history information provided from a navigation device, the history information including drive history of the moving object on which the navigation device is mounted, operation history of the moving object or the navigation device, and the like. Specifically, this method is configured as the following.

The traffic information collecting method in the information center according to the present invention allows a storage unit in the information center to store map data. Then, this traffic information collecting method executes a judging step which judges whether or not history information is recorded in a data recording medium which is mountable on the navigation device, and a map updating step which writes the map data into the data recording medium when the judging step determines that the history information is recorded in the data recording medium.

It is also possible to store statistical traffic information (traffic information such as link travel time, being created by statistically processing the past traffic information) in the storage unit in the information center. Then, this traffic information collecting method may execute the judging step to judge whether or not the history information is recorded in the data recording medium which is mountable on the navigation device, and statistical traffic information updating step which writes the statistical traffic information in the data recording medium, when the judging step determines that the history information is recorded in the data recording medium.

The data recording medium is demountable (removable) from the navigation device.

In addition, a history information collecting method of the navigation device, on which the data recording medium used in the traffic information collecting method of the information center is mounted, allows the navigation device to execute a history information collecting step which collects the history information, and a history information recording step which records in the data recording medium, the history information collected by the history information collecting step.

An information processing method of the navigation device according to the present invention is provided with a connection means which connects the navigation device with the information center via a network, and a storage unit which stores map data. Then, the method executes, history information collecting step which collects history information, sending step which sends the history information collected by the history information collecting step to the information center, a map data receiving step which receives map data from the information center, and replacing step which replaces the map data being recorded in the data recording medium, with the map data received by the map data receiving step.

Effect of the Invention

According to the present invention, it is possible to provide a technique to easily collect traffic information such as drive histories of individual users.

BRIEF DESCRIPTION OF DRAWINGS

FIG. 20 is an illustration showing a configuration example of the history information to be uploaded in the information center.

FIG. 21 is an illustration showing a configuration example of the history information to which identifiers are attached, indicating that the information has been uploaded.

FIG. 22 is a flow diagram showing a process to manage the history information of the information center, in the traffic information collecting system according to the second embodiment.

PREFERRED EMBODIMENTS OF THE INVENTION

Hereinafter, one embodiment of the present invention will be explained, with reference to the accompanying drawings.

First Embodiment

Initially, the first embodiment will be described.

Figure 1:
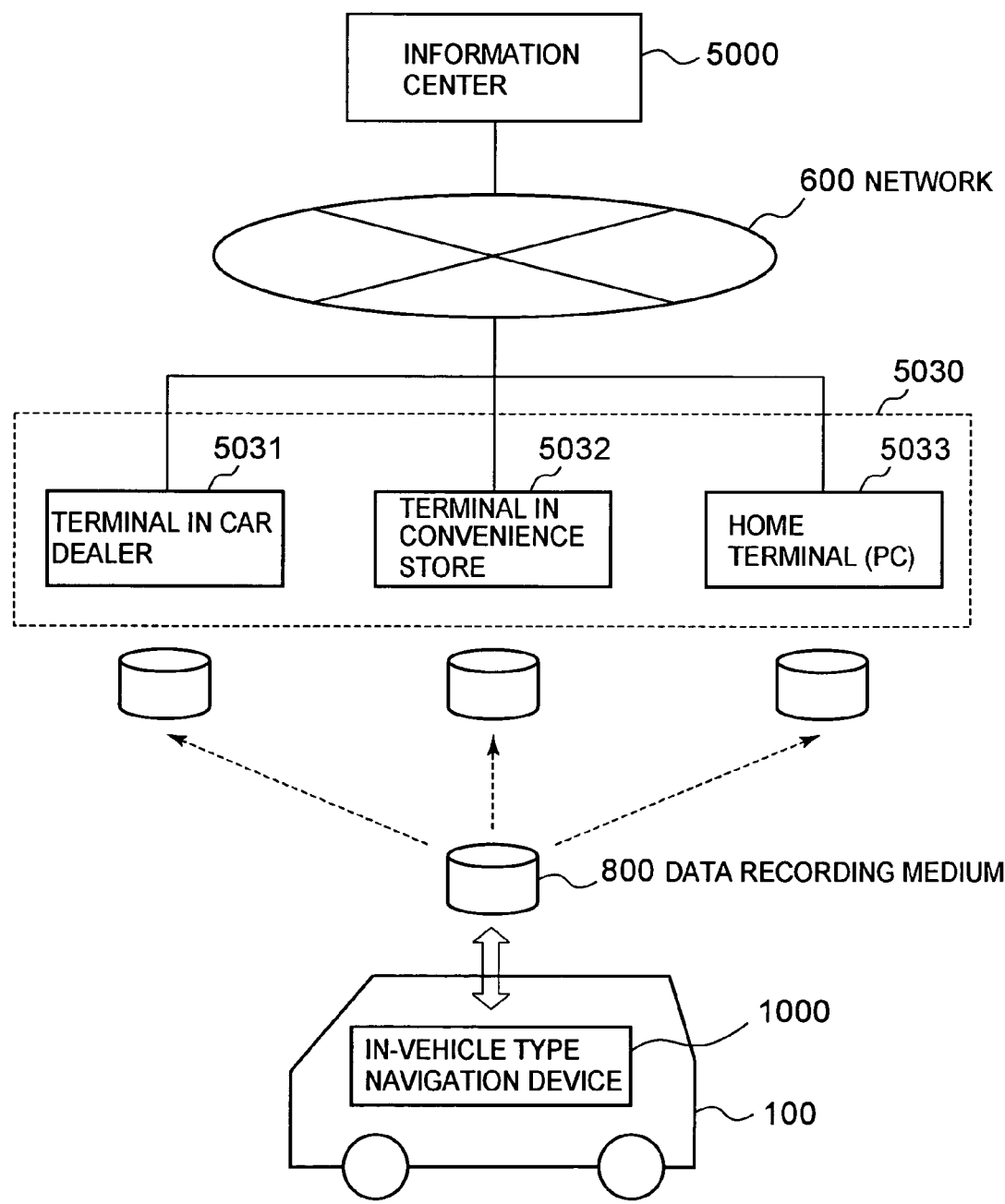
FIG. 1 is a schematic configuration diagram showing a traffic information collecting system to which one embodiment of the present invention is applied.

FIG. 1 is a schematic diagram of the traffic information collecting system to which one embodiment of the present invention is applied. As illustrated, the traffic information collecting system according to the present embodiment incorporates, information center 5000 which collects traffic information, a terminal machine 5030 which is connected to the information center 5000 via a network, and an in-vehicle type navigation device 1000 which is mounted on a vehicle 100. The terminal machine 5030 may be a terminal machine 5031 installed at an automobile related business place, such as a car dealer, a terminal machine 5032 installed at a business place basically not related to automobile, such as a convenience store, and a terminal machine 5033 such as personal computer, which is installed at home of user, and the like. Sending and receiving of information between the in-vehicle type navigation device 1000 and the terminal machine 5030 is carried out via a data recording medium 800, which is rewritable and detachable from the in-vehicle type navigation device 1000.

Figure 2:
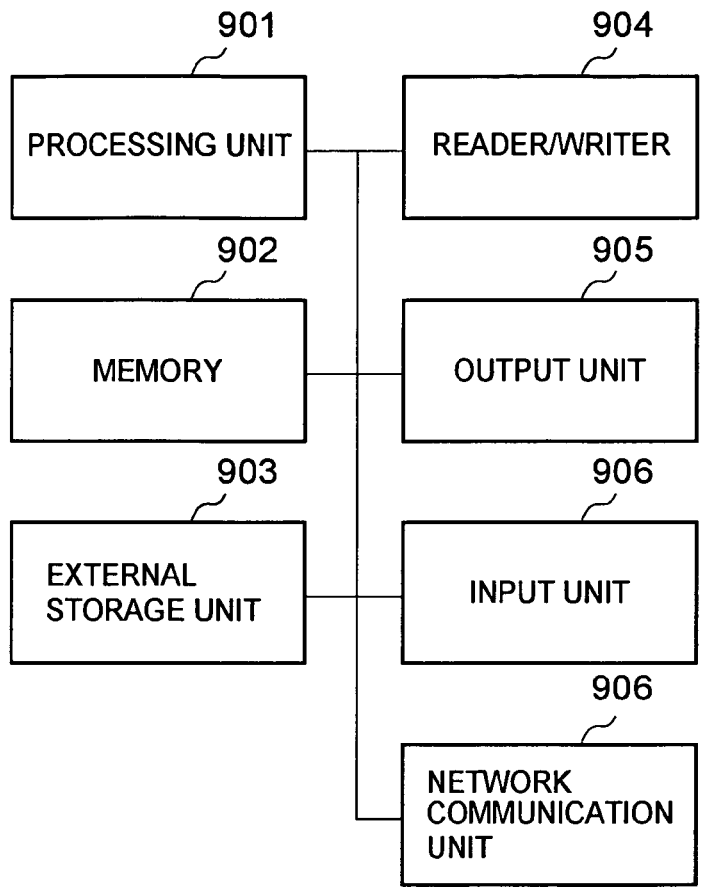
FIG. 2 is a diagram showing a hardware configuration of an information center and a terminal machine.

FIG. 2 is a diagram showing a hardware configuration of the information center 5000 and the terminal machine 5030. As illustrated, the information center 5000 and the terminal machine 5030 are implemented by a computer system that incorporates a processing unit 901, memory 902, external storage unit 903 such as HDD, reader/writer 904 which reads/write information from/to the data recording medium 800, an output unit 905 such as display and printer, input unit 906 such as keyboard, mouse, and scanner, and a network communication unit 907 which sends and receives information to/from another equipment via the network. It is to be noted that various processing of the information center 5000 and the terminal machine 5030, which will be described below, can be established when the processing unit 901 executes a program loaded on the memory 902.

Figure 3:
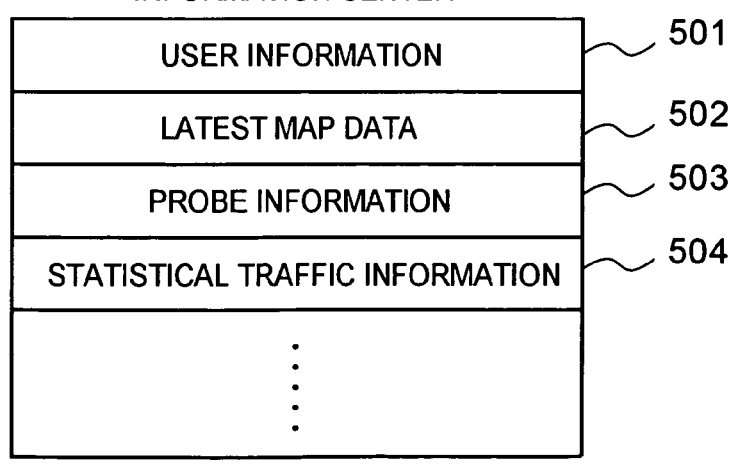
FIG. 3 is a diagram showing a configuration of information that is stored in a storage unit of the information center.

FIG. 3 is a diagram showing a configuration of the information that is stored in the external storage unit 903 of the information center 5000. As illustrated, there are stored in the external storage unit 903 of the information center 5000, user information 501, the latest map data 502, probe information 503, and statistical traffic information 504. User information 501 includes information of user individuals, such as code identifying the user (user ID), full name and address of the user. The latest map data 502 includes updated map data being created periodically.

The latest map data 502 includes an identification code (mesh ID) of a mesh area that is obtained by dividing the map into predetermined areas, and link data of each of links constituting roads that are contained in the mesh area. The link data includes identification code of a link (link ID), coordinate information of two nodes constituting the link (start node, end node), link length being a length of the link, type information of a road that contains the link, and the like. The latest map data 502 further includes spot data that is used in spot searching process of the in-vehicle type navigation device 1000. As to a specific spot (for example, a point available as a landmark), data of the spot includes name, coordinate information, and the like, of that specific spot. In addition, the map data includes information which specifies the data creation date (version information, and the like).

The probe information 503 includes history information collected by the in-vehicle type navigation device 1000 such as drive history of the vehicle 100.

The statistical traffic information 504 is traffic information that is created by statistically processing the probe information 503 having been accumulated. The statistical traffic information 503 includes link travel time (and/or travel speed (moving speed)) being associated with a collecting condition (date and time, weather, and the like) and the link ID.

Figure 4:
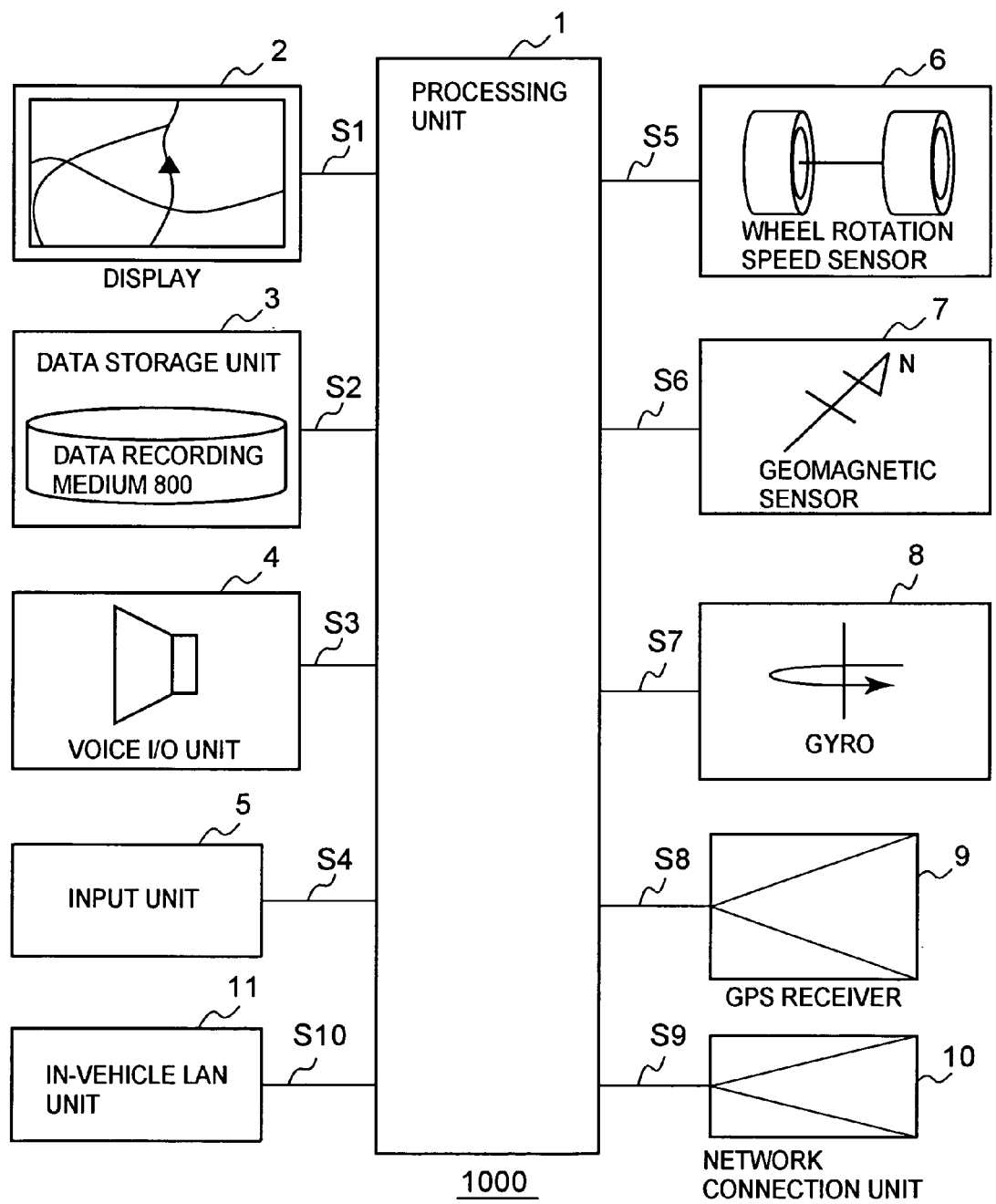
FIG. 4 is a schematic configuration diagram showing an in-vehicle type navigation device 1000.

FIG. 4 is a schematic configuration of the in-vehicle type navigation 1000. As illustrated, the in-vehicle type navigation 1000 according to the present embodiment includes a processing unit 1, display 2, data storage unit 3, voice I/O unit 4, input unit 5, wheel rotation speed sensor 6, geomagnetic sensor 7, gyro sensor 8, GPS (Global Positioning System) receiver 9, in-vehicle LAN unit 11, and network connection unit 10.

The processing unit 1 is a central unit which conducts various processing. For example, it detects a current position based on the information outputted from the various sensors 6 to 8 and the GPS receiver 9, and reads map data required for displaying from the map data storage unit 3 according to the current position information thus obtained. In addition, the processing unit 1 expands the map data thus readout to graphics to be displayed on the display 2, with a mark superimposing thereon which indicates the current position. The processing unit 1 further utilizes the map data stored in the map data storage unit 3, makes a search for an optimum route (recommended route) which connects a destination indicated by the user with the current position (departure place), and guides the user by use of the voice I/O unit 4 and the display 2.

The display 2 is a unit which displays the graphics information generated by the processing unit 1, and incorporates a CRT, a liquid crystal display, and the like. It is general that a signal S1 to connect the processing unit 1 with the display 2 is RGB signal or NTSC (National Television System Committee) signal.

The data storage unit 3 incorporates a data storage medium 800, such as CD-RW, DVD-RW, HDD, and IC card, which is rewritable and detachable from the in-vehicle type navigation device 1000.

Figures 5, 6, 7:
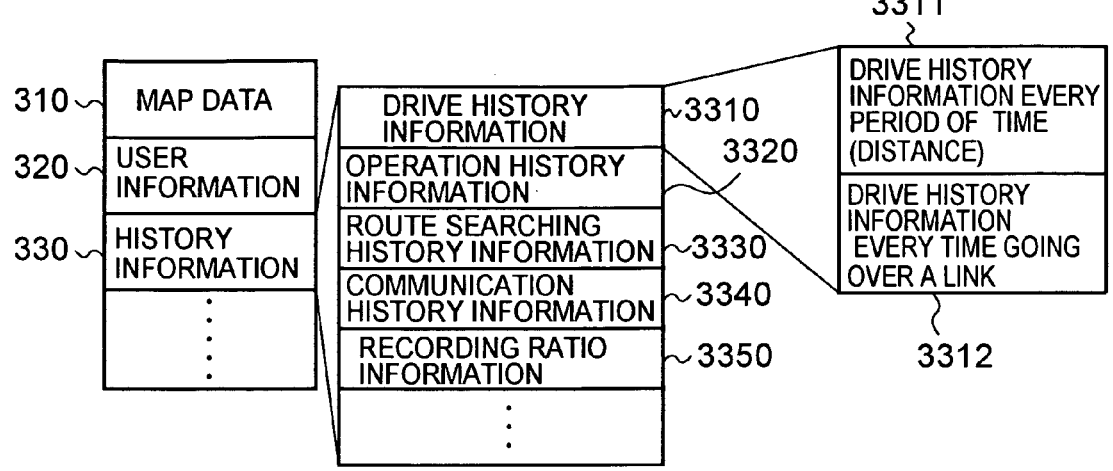
FIG. 5 is a diagram showing a configuration example of information that is recorded in a data recording medium.
FIG. 6 is a diagram showing a configuration example of drive information every predetermined period of time (predetermined distance).
FIG. 7 is a diagram showing a configuration example of drive information every time going over a link.

FIG. 5 is a diagram showing a configuration example of the map data 310, user information 320, history information 330, and the like, which are stored in the data recording medium 800. The map data 310 may not be the latest one, but it has the same configuration as the latest map data 502 held by the information center 5000. The user information 320 includes information of user individuals, such as ID, name, address of the user who uses the in-vehicle type navigation device 1000.

As shown in FIG. 5, the history information 330 includes drive history information 3310, operation history information 3320, route searching history information 3330, communication history information 3340, recording ratio information 3350, and the like.

The drive history information 3310 includes drive history information 3311 every predetermined period of time (or distance), and drive history information 3312 every time going over a link. As shown in FIG. 6, the drive history information 3311 every predetermined period of time (or distance) includes measured date and time 33111, position of the vehicle (latitude, longitude, mesh area, and the like) 33112, link ID 33113 on which the vehicle exists, and the vehicle information 33114. The vehicle information 33114 includes information items, such as ON/OFF information of parking brake, wiper, blinkers, and the like, and information collectable by in-vehicle type equipment such as lighting intensity sensor, exterior temperature, and engine speed.

As shown in FIG. 7, the drive history information 3312 every time going over a link includes link entering date and time 33121, link ID 33122, vehicle information 33123, and link travel time 33124. The vehicle information 3312 includes, similar to the vehicle information 33114, information items, such as ON/OFF information of parking brake, wiper, blinkers, and the like, and information collectable by in-vehicle type equipment such as lighting intensity sensor, exterior temperature, and engine speed.

Returning to FIG. 4, explanation will be continued further. The voice I/O unit 4 performs processing to convert a message to the user generated in the processing unit 1 into a voice signal and output thus converted signal. The voice I/O unit also performs processing to recognize a voice from the user so that the description thereof is transferred to the processing unit 1.

The input unit 5 is a unit to receive a directive from the user, and incorporates hardware switches such as a scrolling key and a scale change key, a joystick, a touch panel placed on the display, and the like.

The sensors 6 to 8 and the GPS receiver 9 are utilized to detect a current position (user's vehicle position) on the in-vehicle navigation device. The wheel speed sensor 6 measures a distance according to a product by multiplying the circumference of the wheel and the number of revolutions of the wheel which is subjected to the measurement. Further, an angle at which the moving object makes a turn is measured according to a difference between the number of revolutions of the pertinent wheel and that of the other wheel in a pair. The geomagnetic sensor 7 detects a magnetic field held by the earth, and detects the bearings of the moving object. The gyro 8 includes an optical fiber gyro, a vibration gyro, and the like, and detects an angle at which the moving object makes a turn. The GPS receiver 9 receives a signal from GPS satellites, and measures distances between the vehicle and each of at least three GPS satellites and change rates of the distances, thereby measuring a current position, a travel direction and a travel azimuth of the moving object.

The in-vehicle LAN unit 11 receives various information items from various sensors that are attached to the vehicle 100, on which the in-vehicle type navigation device 1000 is mounted. The various information items includes, for example, ON/OFF information of parking brake, wiper, blinkers, and the like, and information such as lighting intensity, exterior temperature, engine speed. Then, those information items are transmitted to the history information processor 55 described below.

The network connection unit 10 controls, for example, a wireless communication device such as portable phone, being connected to the in-vehicle type navigation device 1000, and accesses the information center 5000 via wireless base station and a network such as public network and the Internet, which are not illustrated.

Figure 8:
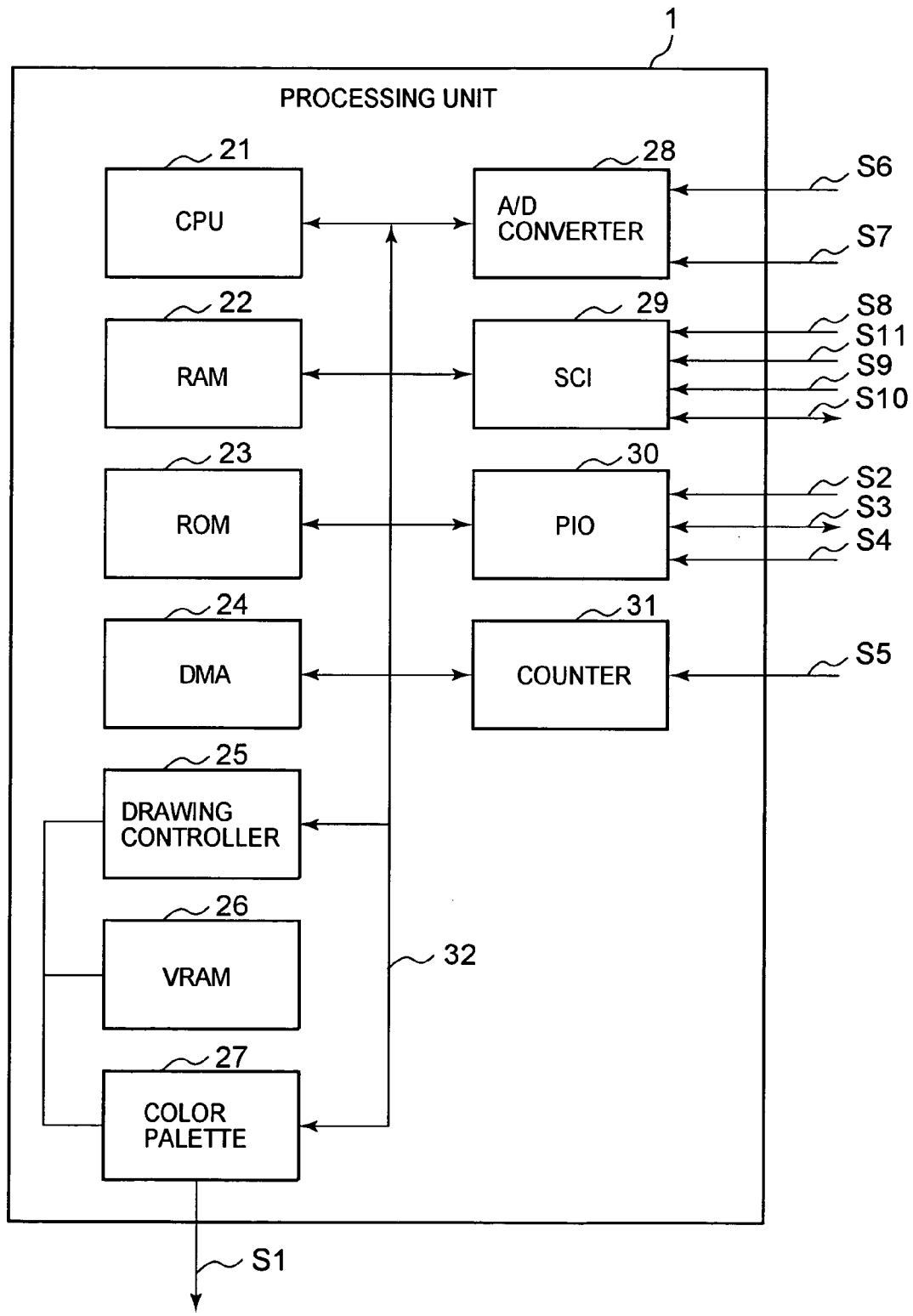
FIG. 8 is a diagram showing a hardware configuration of processing unit 1 of the in-vehicle type navigation device.

FIG. 8 is a block diagram showing a hardware configuration example of the processing unit 1.

As illustrated, the processing unit 1 has such a structure that various devices are connected to one another through a bus 32. The processing unit 1 includes a CPU (Central Processing Unit) 21 which performs various processing such as numerical calculation and controlling each device, an RAM (Random Access Memory) 22 which stores map data and computational data which are read out from the map data storage unit 3, an ROM (Read Only Memory) 23 which stores programs and data, a DMA (Direct Memory Access) 24 which performs data transmission between memories and between each memory and each device, a drawing controller 25 which performs graphics drawing and also performing display control, a VRAM (Video Random Access Memory) 26 which stores graphics image data, a color pallet 27 which converts image data into RGB signals, an A/D converter 28 which converts analog signals to digital signals, an SCI (Serial Communication Interface) 29 which converts serial signals to parallel signals which are synchronized with the bus, a PIO (Parallel Input/Output) 30 which puts the parallel signals on the bus in synchronization with the bus, and a counter 31 which integrates pulse signals.

Figure 9:
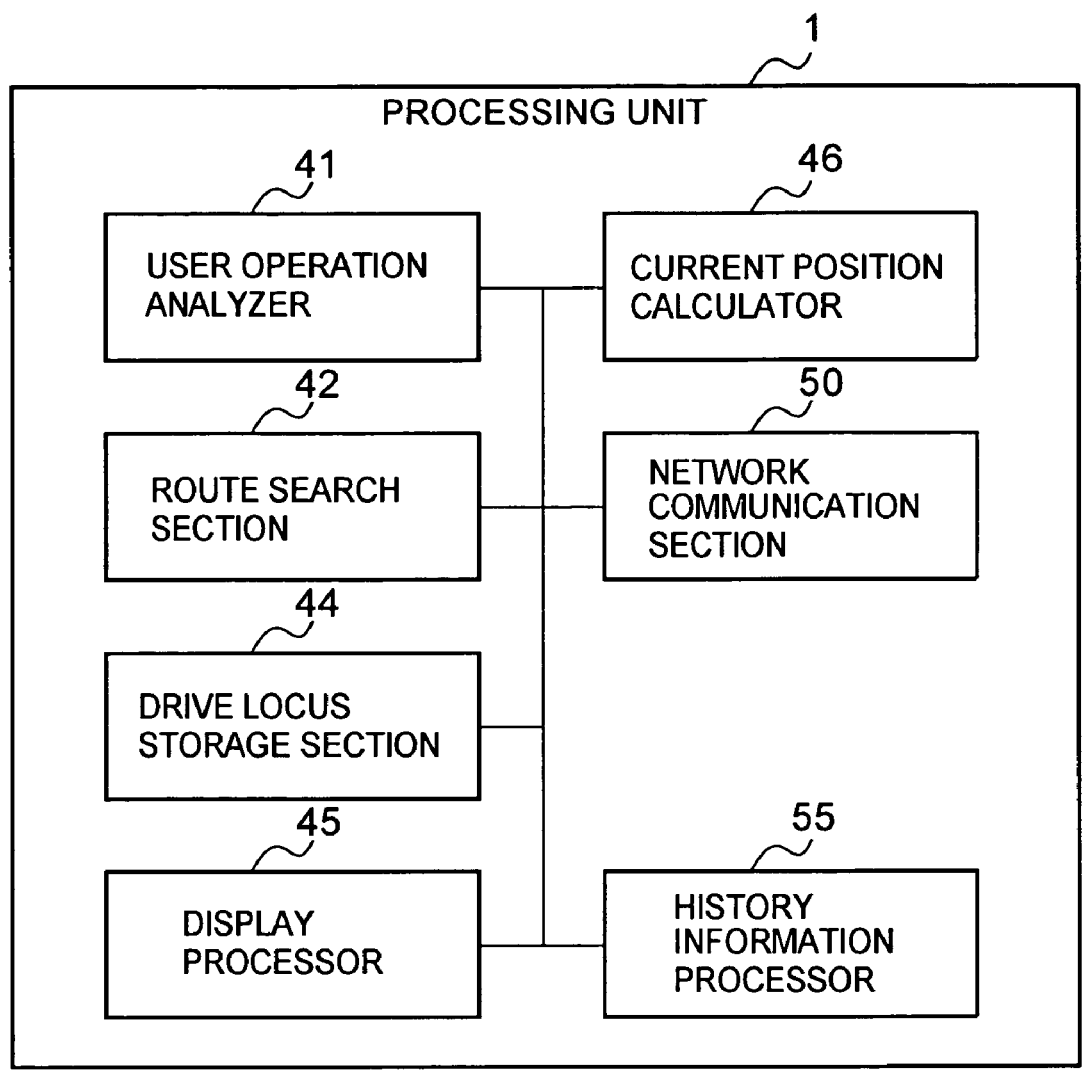
FIG. 9 is a flow diagram showing a functional configuration of the processing unit 1 of the in-vehicle type navigation device.

FIG. 9 is a diagram showing a functional structure of the processing unit 1.

As illustrated, the processing unit 1 includes a user operation analyzer 41, a route search section 42, a drive locus storage section 44, a display processor 45, a current position calculator 46, a network communication section 50, and history information processor 55.

The current position calculator 46 utilizes distance data and angle data, which are obtained by integrating each of the distance pulse data S5 measured by the wheel speed sensor 6 and the angular acceleration data S7 measured by the gyro 8, and periodically calculate the current position (X', Y'). Then, map matching process using the map data is performed, thereby calculating the current position on the map.

The user operation analyzer 41 receives a user's request inputted into the input unit 5 to analyze the description of the request, and controls each part of the processing unit 1 so that the processing in response to the request description is executed. In addition, the user operation analyzer 41 accepts information of operations performed by the user against the vehicle (for example, ON/OFF information as to the blinker and the wiper, open and close information of the doors, lighting status information, brake operation information, accelerator operation information, and the like), which have been collected via the in-vehicle LAN, and then transmits those information items to the history information processor 55.

The route search section 42 makes a search for a route to reach the destination at the minimum cost (for example, travel time), out of routes connecting two specified points (the current position and the destination), by the use of the Dijkstra method or the like. In addition, the route search section performs route guidance utilizing the route thus searched out.

The drive locus storage section 44 stores as locus data, the current position information to which the map matching processing has been applied, every time the own vehicle runs for a predetermined distance. The locus data is used to draw a locus mark on a corresponding road on the map, along which the vehicle has driven so far. For the drive locus storage unit 44, a memory such as RAM and SRAM, which is different from the data recording medium 800, is employed.

The display processor 45 generates a command for displaying on the display 2. For example, the display processor 45 receives from the data storage unit 3, the map data in an area which is requested to be displayed on the display 2, and generates map drawing commands so as to draw a road, other map constituents, the current position, the destination, and marks such as an arrow for guiding route, in a scale and a drawing mode, being specified by the user operation analyzer 41, or the like.

The network communication section 50 sends and receives information via the network, between the navigation device 1000 and the information center 5000 or other information delivery center.

The history information processor 55 collects information to be recorded as history information 330, and records the information in the data recording medium 800 via a data reader/writer, not illustrated. Further, the history information processor 55 reads out and edits the history information 330 recorded in the data recording medium 800.

The in-vehicle type navigation device 1000 configured as described above performs navigation process according to a user's directive. During this process, the navigation device accumulates in the data recording medium 800, drive history of the vehicle, operation history of the user, route search history, communication history, and the like.

[Description of Operations]

Figure 10:
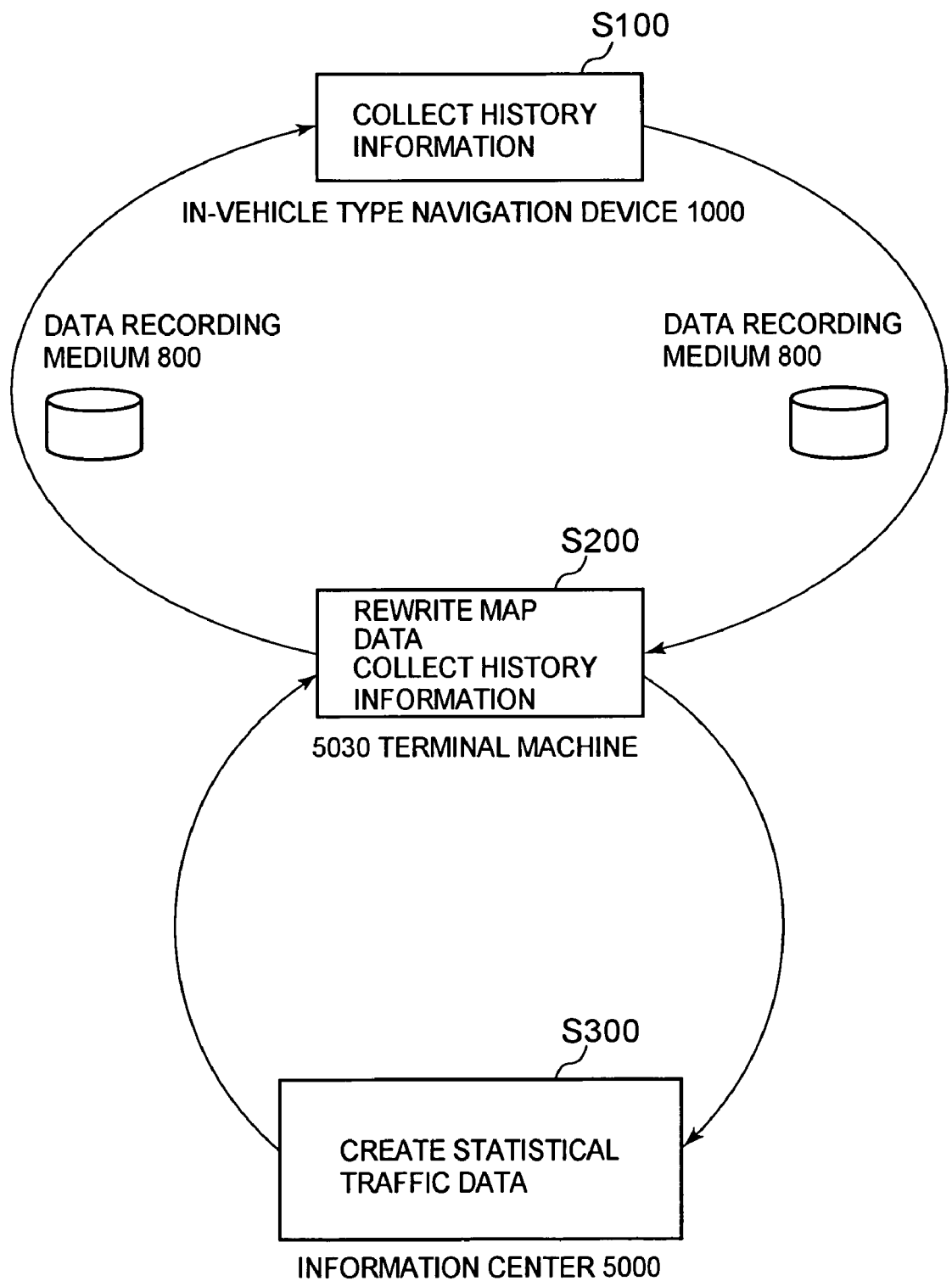
FIG. 10 is a flow diagram showing a schematic flow of a process of the traffic information collecting system.

Next, an operation of the traffic information collecting system with the above configuration will be explained. FIG. 10 is an illustration showing a schematic flow of a processing of the traffic information collecting system according to the present embodiment.

As illustrated, the in-vehicle type navigation device 1000 collects the history information 330, and records the collected information into the data recording medium 800 (S100). The data recording medium 800 demounted from the in-vehicle type navigation system is read by the terminal machine 5030. Then, the terminal machine 5030 receives a directive from the information center 5000 to read and delete the history information 330 in the data recording medium 800, and perform map data rewriting into the latest one (S200). The data recording medium 800 processed by the terminal machine 5030 is installed on the in-vehicle type navigation device 1000 again, to perform accumulation of history information 330 (S100). On the other hand, the information center 5000 accumulates the history information 330 received from the terminal machine 5030 as probe information 503, and generates statistical traffic information 504 on the basis of the probe information 503 thus accumulated. The information center 5000 transmits thus generated statistical traffic information 504 in response to a request from the in-vehicle type navigation device 1000.

Each of the above processes (S100 to S300) will be explained in detail in the following.

[Process for Collecting History Information]

Firstly, a process for collecting the history information 330 (S100), which is executed by the in-vehicle type navigation device 1000, will be explained.

Figure 11:
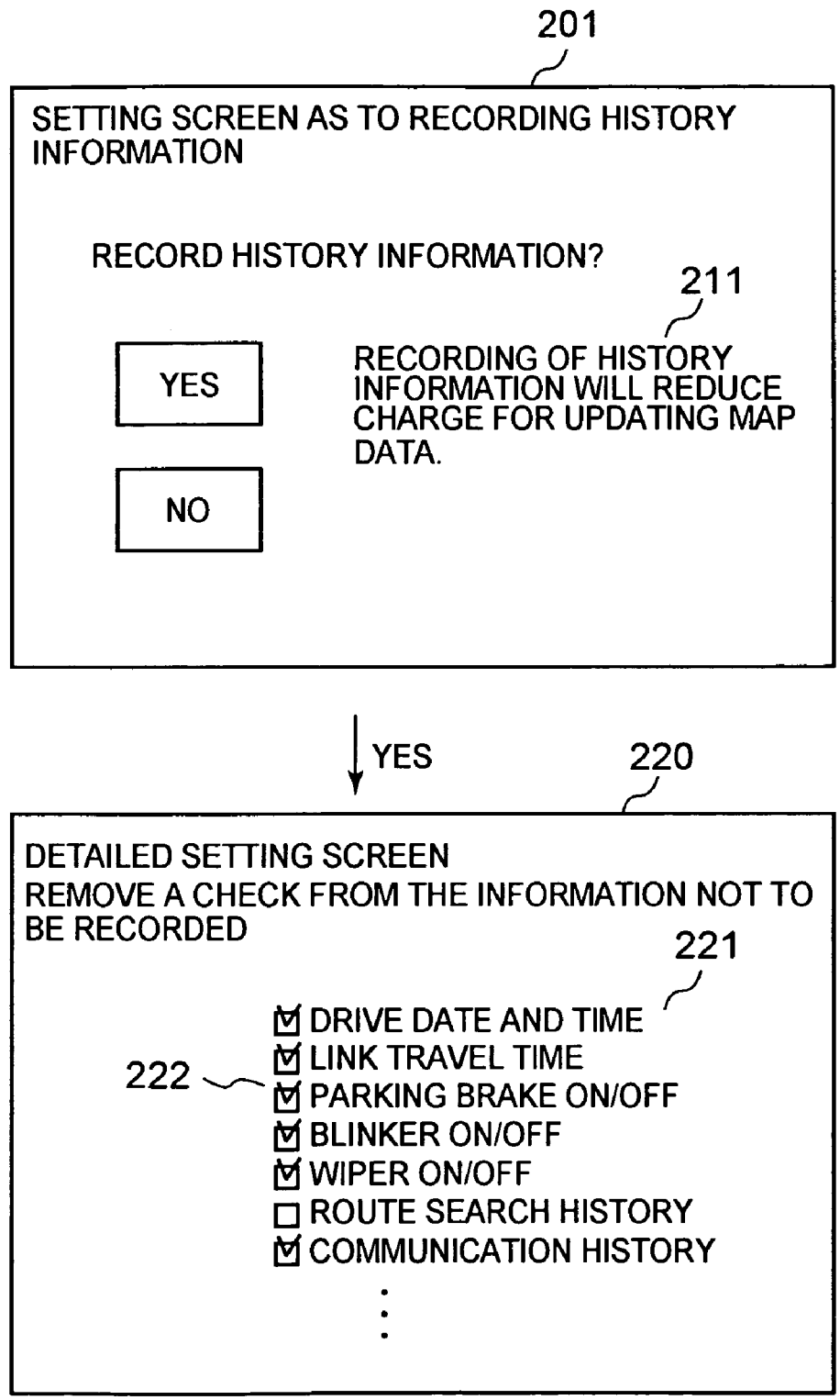
FIG. 11 is an illustration showing a transition example of screen displays in setting information to be recorded.

The in-vehicle type navigation device 1000 firstly sets whether or not the history information 330 is to be recorded in the data recording medium 800. Since some users do not want the history information 330 is recorded, this setting is prepared so as to respond to such request. Specifically, as shown in FIG. 11, the history information processor 55 displays on the screen 201 for setting a decision whether or not the history information 330 is recorded, on the display 2 via the display processor 45. In this situation, the history information processor 55 displays an advantage which will be given to the user, if the history information is recorded. For example, a message 211 will be displayed, such as "RECORDING OF HISTORY INFORMATION WILL REDUCE CHARGE FOR UPDATING MAP DATA."

If it is requested from the user via the input unit 5 not to record the history information, the history information processor 55 does not perform the following history information creating process, so as not to record the history information 330 in the data recording medium 800.

On the other hand, if recording of the history information 330 is requested, as shown in FIG. 11, the history information processor 55 displays on the display 2 via the display processor 45, a screen 220 for setting a type of information to be recorded. In the example of FIG. 11, the history information processor 55 displays on the screen 220, a list of information candidates 221 to be recorded. It is to be noted that a selection of information item not to be recorded can be made by removing check 222. The history information processor 55 sets the information item whose check 222 has not been removed so as to be recorded in the data recording medium 800 as history information 330, according to the following history information creating process.

According to the procedure as described above, when a setting of information to be recorded as history information 330 is made, the history information processor 5 performs a processing to create the history information 330.

Figure 12:
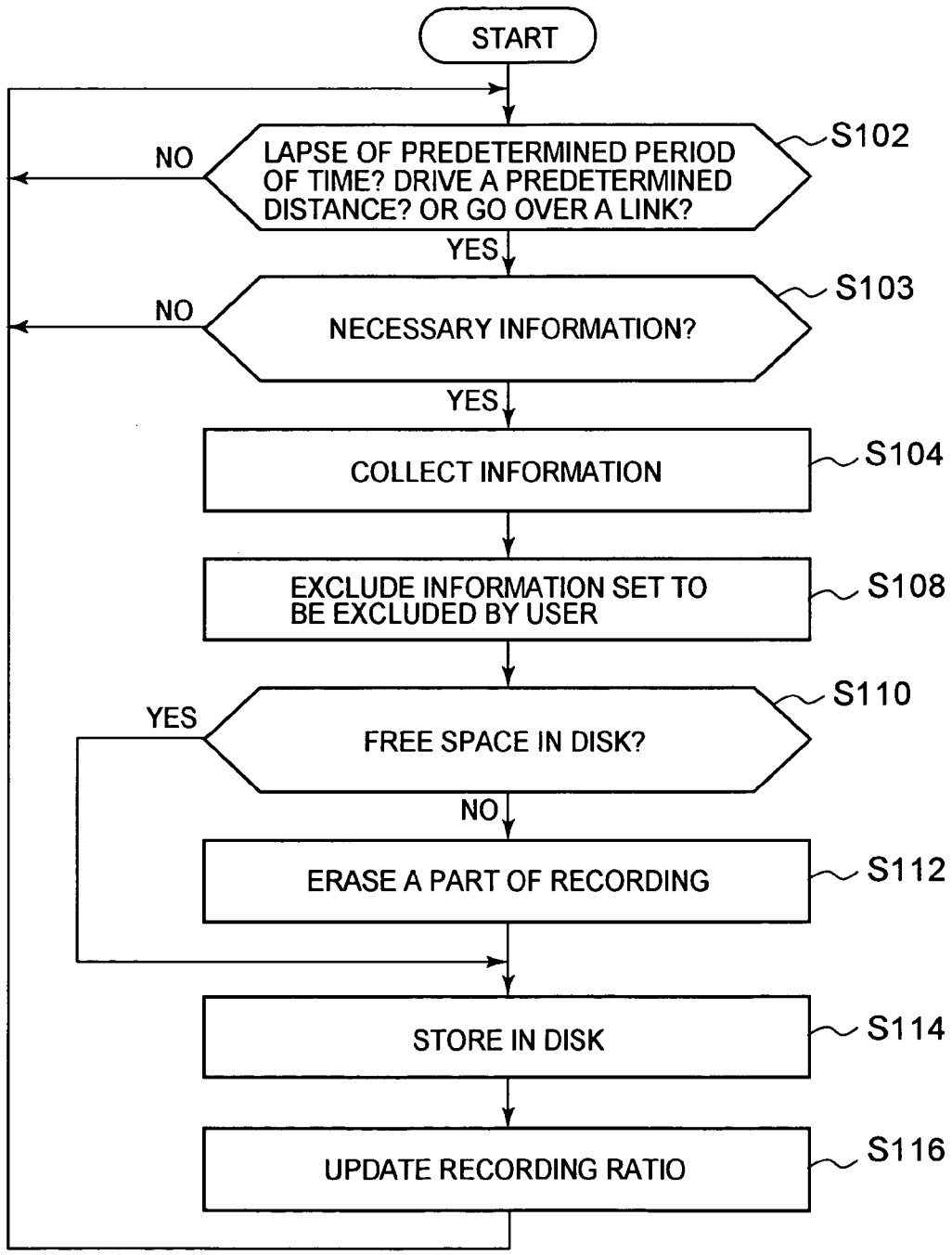
FIG. 12 is a flow diagram showing a flow of process to generate drive history information.

FIG. 12 is a flow diagram showing a flow which creates drive history information 3310 in the history information 330.

In general, this flow is constantly carried out while the power of the in-vehicle type navigation device 1000 is being on.

The history information processor 55 keeps monitoring whether or not a predetermined period of time (a predetermined time, for example, 10 seconds) has elapsed, whether or not driving has reached a predetermined distance (a predetermined distance, for example 100 m), or whether or not the vehicle goes over a link (reaches a different link ID) (S102). If any of the above situations is determined as positive (Yes in S102), the history information processor 55 determines whether or not the information currently collectable is recorded as history information 330 (S103). Specifically, the history information processor 55 does not record the currently collectable information, if the current date and time is within a time zone (for example midnight) that is configured such that recording of history information is unnecessary. Furthermore, the history information processor 55 does not record the currently collectable information as history information, either, if the current position is at a place where recording of history information is unnecessary, for example, on a very narrow road (a link with a road width of 5 meters or less), or on a road that is not recorded in the map data. Then, processing returns to S102 and it is continued. Other than the above case, the history information processor 55 determines that it is necessary to record the history information and shifts the process to S104. It is to be noted that date and time, and road type, which are assumed as not necessary to record history information, are predefined.

In S104, in the case where it is determined that a predetermined period of time has elapsed in S102 or it is determined that a distance already driven has reached a predetermined distance, the history information processor 55 obtains from the current position calculator 46, the current position (latitude, longitude) and a link ID 33113 where the current position is located. In addition, the history information processor 55 further obtains the vehicle information 33114 (ON/OFF information as to blinker, wiper, parking brake, and the like, open and close information of the doors, lighting status information, brake operation information, accelerator operation information, and the like), which is collected via in-vehicle LAN.

In the case where it is determined in S102 that the vehicle goes over a link, the history information processor 55 obtains link ID of the link from the current position calculator 46, and further obtains vehicle information collected through the in-vehicle LAN.

Next, the history information processor 55 determines whether or not the obtained information is configured by the user such that it is not recorded as history information. If there is an information item that is set as not to be recorded, that information item is excluded (S108).

Next, the history information processor 55 judges whether or not the data recording medium 800 has a free space sufficient for recording thus collected history information (S110). If there is an enough free space (Yes in S110), the history information processor 55 shifts the processing to S114 and continue processing. On the other hand, if there is not sufficient free space (No in S110), the history information processor 55 erases a part of the history information 330 which is already recorded in the data recording medium 800, so that a free space is created. Specifically, the history information processor 55 refers to the history information date and time 33111 and 33121 of the drive history information 3310, and deletes the information sequentially from the one being older in date and time. In addition, information relating to a predetermined specific road (a road which is not significant as history information, such as a narrow road) is deleted (erased) (S112).

As thus described, when a sufficient free space is reserved to record the information items left in S108 this time, the history information processor 55 records those information items in the data recording medium 800 (S114).

It is to be noted that the link travel time 3124 is obtained based on a difference between the link entering date and time 3312 and the date and time of going out of the link (next link entering date and time).

Accordingly, the drive history information 3310 as shown in FIG. 6 and FIG. 7 is created.

Next, the history information processor 55 obtains a recording ratio 3350 by the following expression. It is to be noted that the "number of information" in the following expression indicates the number of items (number of fields) of the information.

Recording ratio=(the number of information items having already been recorded+the number of information items recorded this time)/{(the number of information items having already been recorded)+(the number of information items collected in S104)}

Then, the recording ratio 3350 being obtained is recorded in the data recording medium 800. If it is already recorded, the recording ratio 3350 is updated (S116). Then, the history information processor 55 returns to S102 and repeats the above process. According to the procedure above, the drive history information 3310 is accumulated.

In addition, the recording ratio may also be obtained by the following expression.

Recording ratio={(the number of information items excluding the information items which are not subject to recording according to user's directive)/(the number of all information items as recording target).

In the above description, a process for creating the drive history information 3310 has been explained. Another process for creating the history information will be explained in the following.

Creation of the operation history information 3320 is carried out as the following. In other words, the history information processor 55 receives via the in-vehicle LAN, the operational information (ON/OFF information as to blinker, wiper, parking brake, and the like, open and close information of the doors, lighting status information, brake operation information, accelerator operation information, and the like), which the user has performed against the vehicle. Then, the history information processor 55 records those operation information items in the data recording medium 800 together with the detection date and time.

Creation of the route searching history information 3330 is carried out as the following. In other words, the route searching section 42 accepts a designation of searching conditions (travel time priority, travel distance priority, highway priority, etc.), and makes a search for a recommended route from a departure place to a destination. The history information processor 55 receives from the route searching section 42, the route searching condition, the departure place, the destination, and a route of the recommended path. Then, the history information processor 55 records thus received information items in the data recording medium 800 together with the date and time when the route search was conducted.

Creation of the communication history information 3340 is carried out as the following. That is, the network communication section 50 performs communication for sending and receiving traffic information with the information center 5000, periodically or in response to the user's request. The history information processor 55 receives the date and time when the communication was performed and descriptions thereof, from the network communication section 50. Then, the history information processor 55 records thus received information in the data recording medium 800 as communication history information 3340.

Also for the case of recording the operation history information 3320, the route searching history information 3330, or the communication history information 3340, if there is not sufficient free space in the capacity of the data recording medium 800, recording is performed after deleting old information and reserving free space, similar to the case from S110 to S112 as shown in FIG. 12.

A processing to create the history information 330 has been explained in the description above.

[Processing for Reading the History Information on the Terminal Machine]

Next, a processing will be explained, in which the data recording medium 800 is demounted from the in-vehicle type navigation device 1000, and inserted in the reader/writer 904 of the terminal machine 5030. It is to be noted that in the present embodiment, the map data 310 recorded in the data recording medium 800 is rewritten with the latest map data 502 provided by the information center 5000, thereby updating the map data 330. Therefore, if the user 1 wants to update the map data, he or she demounts the data recording medium 800 from the in-vehicle type navigation device 1000, and inserts it into the reader/writer 904 of the terminal machine 5030.

When the data recording medium 800 is inserted into the reader/writer 904, the processing unit 901 of the terminal machine 5030 logs on the information center 5000, via the network, according to a directive from an operator of the terminal machine 5030. It is further possible to configure the operation unit 901 of the terminal machine 5030 such that when it detects that the data recording medium 800 is inserted into the reader/writer 904, the operation unit 901 automatically logs on the information center 5000.

Figure 13:
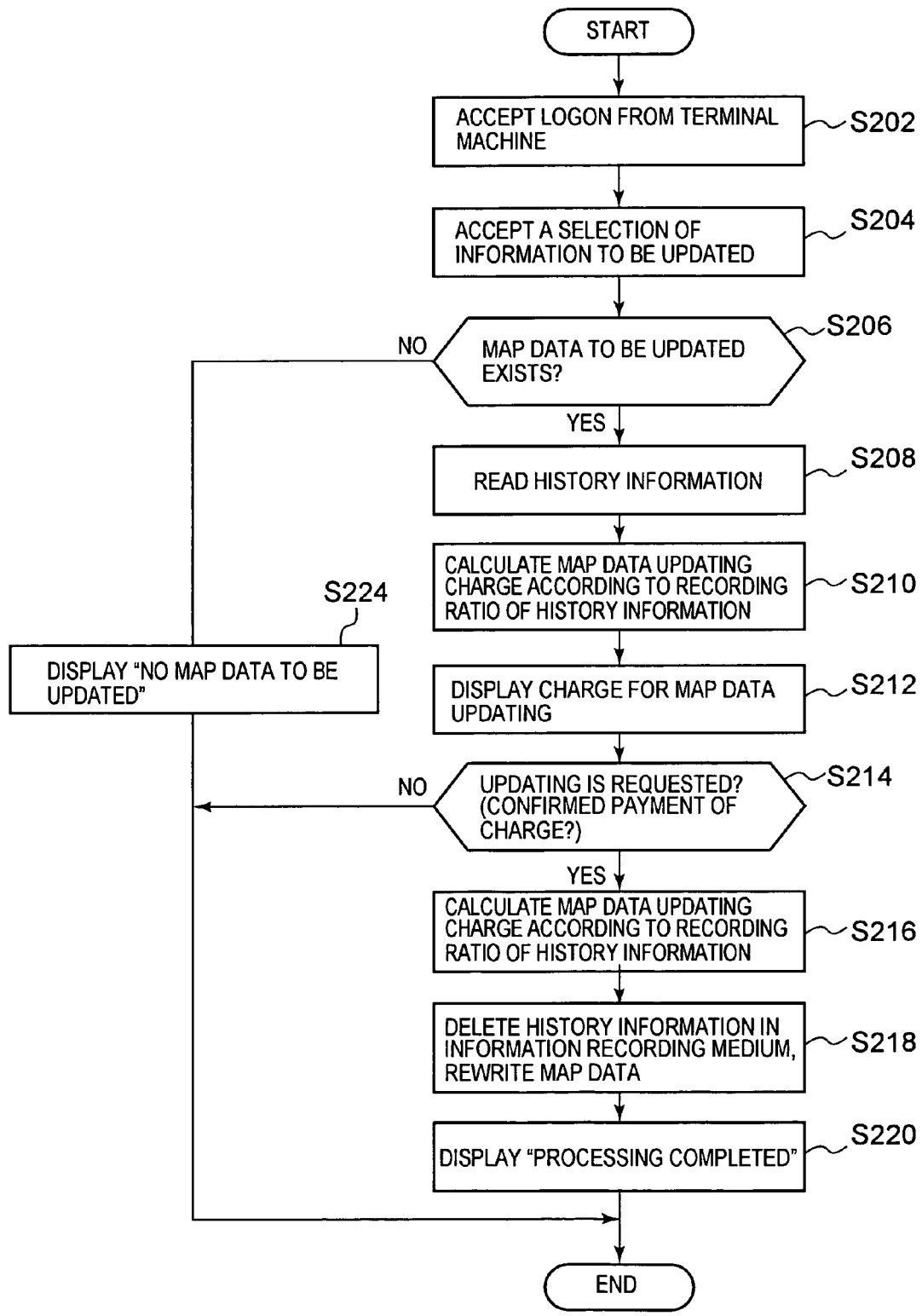
FIG. 13 is a flow diagram showing a process to collect history information and a process to update map data, which are performed by the information center.

FIG. 13 is a flow diagram showing a flow of processing of the information center 5000 when the data recording medium 800 is inserted into the reader/writer 904 of the terminal machine 5030.

Firstly, the operation unit 901 of the information center 5000 accepts logon from the terminal machine 5030 (S202). Next, the operation unit 901 of the information center 5000 instructs the terminal machine to specify information which is to be updated.

In receipt of this instruction, the operation unit 901 of the terminal machine 5030 accepts a selection of information to be updated from the operator via the input unit 906.

Figure 14:
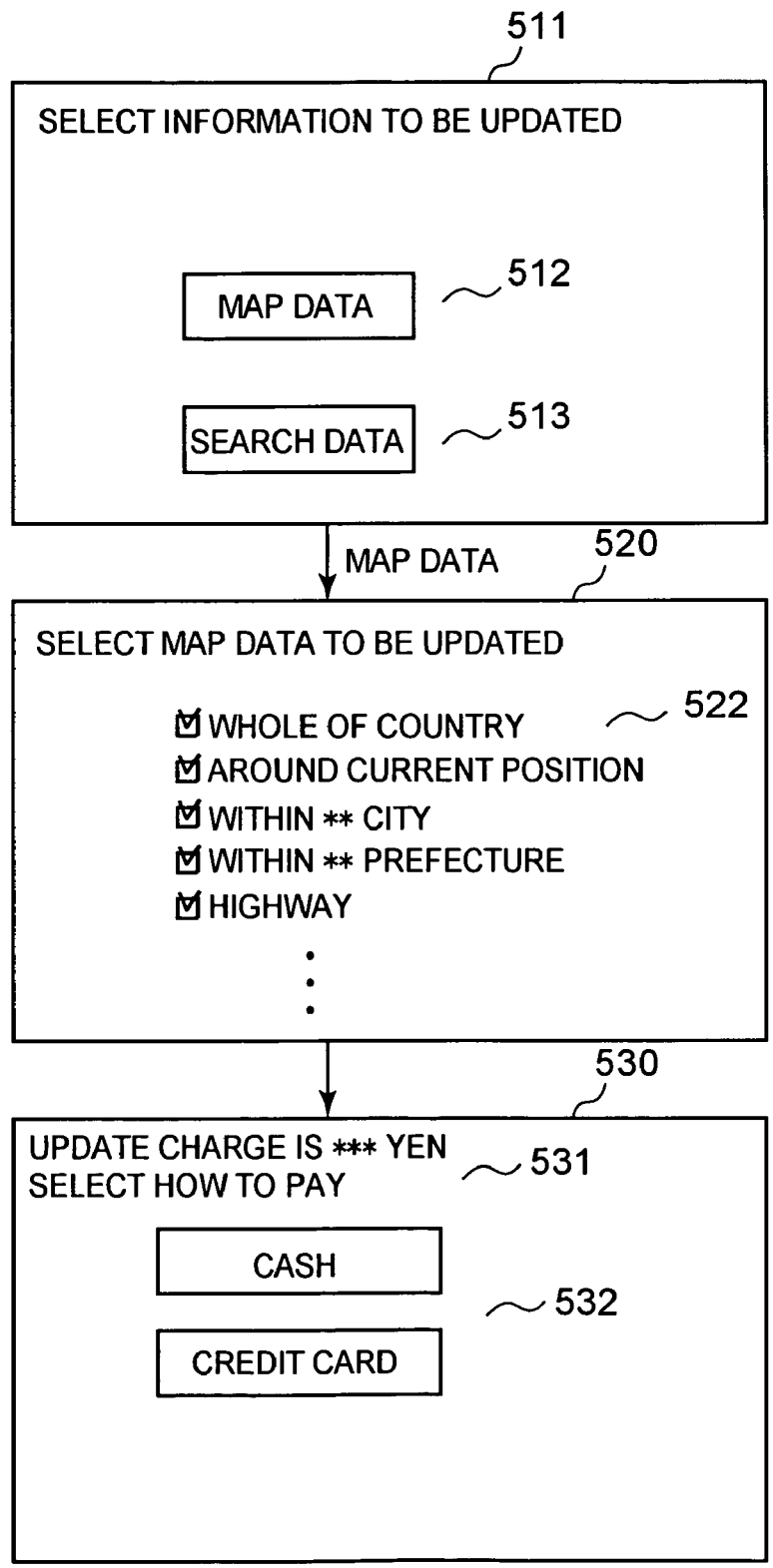
FIG. 14 is an illustration showing a transition example of screen displays of terminal machine in the process to update the map data.

FIG. 14 is an illustration showing a transition example of screens which are displayed on the output unit 905 in the case above. As illustrated, the operation unit 901 of the terminal machine 5030 displays on the screen 511 which accepts selection whether the entire map data is updated or data of a particular spot (name, address, phone number, and the like) included in the map data is updated. If it is selected that the map data is updated, a screen 520 to accept a selection of an area as to which the map data is updated is displayed. The area of the map data to be updated may be selectable from the following: whole country, around the current position (e.g., within the radius of 100 m), within a city, and within a prefecture; or in the unit of mesh. When any of the options is selected and an information item to be updated is specified, the operation unit 901 of the terminal machine 5030 transmits the selection (information to be updated) to the information center 5000.

According to the procedure above, when the information to be updated (the area of the map data to be updated) is specified, the operation unit 901 of the information center 5000 determines whether or not there exists the latest information in its own storage unit (S206). Specifically, it is determined whether or not its own external storage unit 903 stores information corresponding to the information to be updated, being specified in S204 and that is newer than the information being recorded in the data recording unit 800. It is to be noted that this decision is made by referring to the information (version information, and the like) which specifies the created date and time of the information. If there is not any new information (No in S206), the operation unit 901 of the information center 5000 instructs the terminal machine 5030 to display a message notifying that there is no information to be updated. In receipt of this, the terminal machine 5030 displays this message on the output unit 905 (S224). Then, the operation unit 901 of the information center 5000 finishes the processing against the data recording medium 800.

On the other hand, in the case where the external storage unit 903 in the information center 5000 records information newer than the information recorded in the data recording device 800 (Yes in S206), the operation unit 901 in the information center 5000 instructs the terminal machine 5030 to read the history information 330. Then, the operation unit further instructs to transmit thus read history information 330 to the information center 5000. In receipt of this instruction, the operation unit 901 of the terminal machine 5030 reads the history information 330 recorded on the data recording medium 800 via the reader/writer 904, and transmits the read-out information to the information center 5000.

Next, the operation unit 901 in the information center 5000 calculates an update charge, according to the following expression, based on the information range to be updated (an area in the map data) and the recording ratio information 3350 of the history information 330. It is to be noted that the update charge and a commission charge according to the information range to be updated in the following expression are predefined.

Update charge=(update charge according to the information range to be updated)×(1−recording ratio)+commission charge A formula which changes linearly according to the recording ratio may not be employed. The update charges may be predefined in incremental steps according to the update charge and recoding ratio. It is further possible to define the minimum amount of the update charge as a basic rate.

When the update charge is calculated, the operation unit 901 in the information center 5000 transmits to the terminal machine 5030 the update charge thus obtained, and in addition, instructs to display the update charge. In receipt of this instruction, the operation unit 901 of the terminal machine 5030 displays the update charge on the output unit 905 as shown in the reference numeral 531 in FIG. 14 (S212).

Next, the operation unit 901 in the information center 5000 accepts a request for updating the map data via the terminal machine 5030. As shown in FIG. 14, reference numeral 532, the terminal machine 5030 may firstly accept a selection of payment of update charge, either in cash or by credit card, and then accept the request for updating. Alternatively, the terminal machine 5030 may be equipped with an amount reader to read the amount of cash or a card reader which reads the credit card, and after confirming the payment, the machine may accept the update request.

When the update request is accepted (Yes in S214) the operation unit 901 in the information center 5000 reads the information necessary for rewriting the map data in the data recording medium 800, from the latest map data 502 in the external storage unit 903. Then, the information thus read out is transmitted to the terminal machine 5030 (S216). Even more particularly, the operation unit instructs the terminal machine 5030 to delete the history information 330 recorded in the data recording medium 800, and to rewrite the map data 310. In receipt of this instruction, the operation unit 901 in the terminal machine 5030 deletes the history information 330 in the data recording medium 800 via the reader/writer 904, and rewrites the map data 330 (S218).

Next, the operation unit 901 in the information center 5000 instructs the terminal machine 5030 to display that the processing is completed. In receipt of this instruction, the operation unit 901 in the terminal machine 5000 displays that the processing is completed on the output unit 905 (S220). Then, the operation unit 901 in the information center 5000 finishes the processing of updating map data.

In the description so far, there has been explained a processing which is performed in the case where the data recording medium 800 is inserted in the terminal machine 5030.

It is to be noted that the processing flow as shown in FIG. 13 does not necessarily follow the sequence as illustrated. For example, accepting of selection of information to be updated (S204) may be performed, after carrying out reading of the history information (S208).

In the flow above, after deleting the history information in the data recording medium 800, the map data is updated. It is further possible to read and save the other information (user information 320, music data, and the like) recorded in the data recording medium 800, temporarily into the external storage unit 903 of the terminal machine 5030. Then, the data in the data recording medium 800 is erased, the latest map data is written in, and thereafter the user information is written again. According to this procedure, it is possible to suppress fragmentation of data in the data recording medium 800.

The update charge is determined according to the recording ratio of the history information. However, it is further possible that the operation unit 901 in the information center 5000 determines whether or not the history information is recorded in the data recording medium 800 in S208, and if it is not recorded, the map data is not updated.

Alternatively, if the history information is configured by the user that it is to be recorded, the operation unit 901 in the information center 5000 may update the map data irrespective of whether or not the history information is recorded in the data recording medium 800. Specifically, if the user configures the history information such that it is to be recorded, the drive history information processor 55 of the in-vehicle type navigation device 100 allows the data recording medium 800 to store information indicating such configuration. The operation unit 901 of the information center 5000 determines whether or not the data recording medium 800 includes the information indicating that the user configures the history information such that it is to be recorded, and if such history information is included, the map data is updated. With the procedure above, it is possible to prevent an inconvenient case that the map data is not updated due to the reason that the history information is not recorded, even though the user oneself intends to providing history information.

It is further possible that even when there is no information to be updated, reading the history information may be performed.

The data recording medium 800 processed by the terminal machine 5030 as described above is again installed on the in-vehicle type navigation device 1000, and accumulation of the history information 330 is carried out (S100). On the other hand, the information center 5000 accumulates the history information 330 received from the terminal machine 5030 as probe information 303. The probe information 303 thus accumulated is used in various ways. In the present embodiment, as one example of the usage, a case where statistical traffic information 504 is created and utilized will be explained.

[Statistical Traffic Information Creating Process]

Hereinafter, a process (S300) in which the statistical traffic information 504 is created from the probe information 503 that is collected in the information center 5000.

Figure 15:
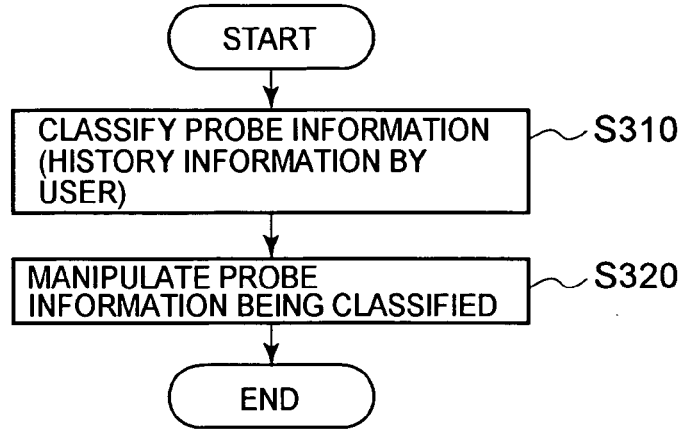
FIG. 15 is a flow diagram to show a flow of process to create statistical traffic information that is performed by the information center.

FIG. 15 is a flow diagram showing a flow of the statistical traffic information creating process. As illustrated, the process to create the statistical traffic information 503 includes a classifying process to classify the probe information 503 (S310), and a manipulating process to manipulate thus classified probe information (S320).

Figure 16:
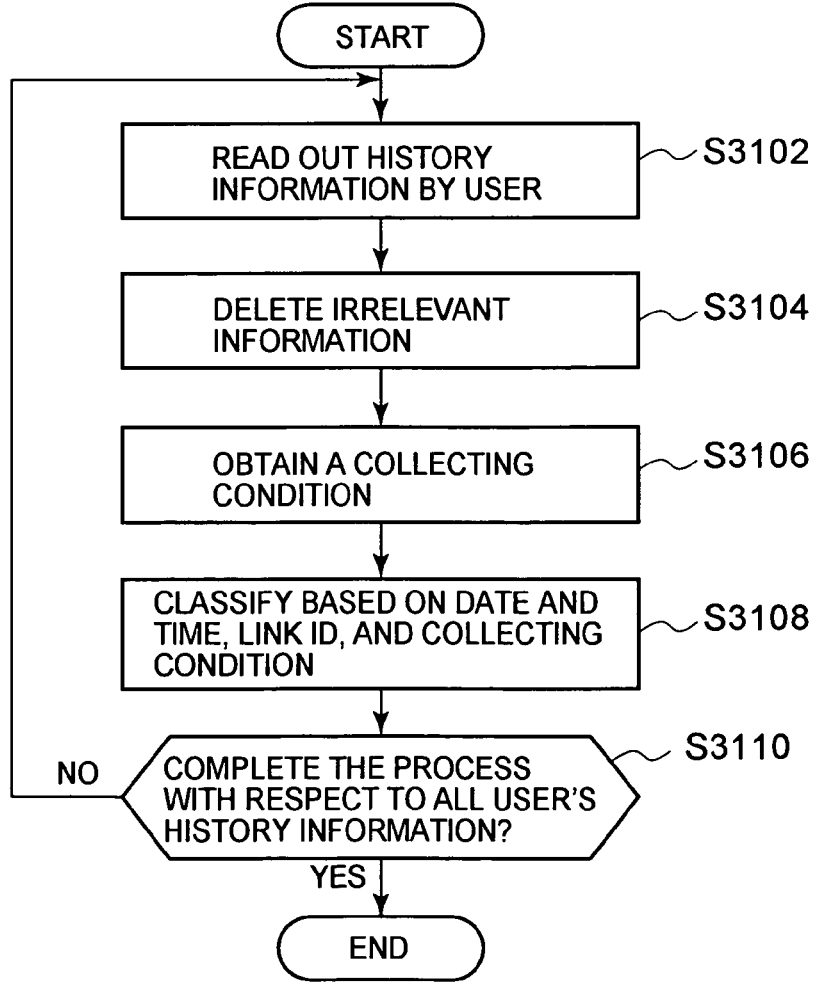
FIG. 16 is a flow diagram showing a flow of the process in S310 (classification of probe information) as shown in FIG. 15.

FIG. 16 is a flow diagram showing a flow of the classifying process (S310) of the probe information 503.

At first, the operation unit 901 in the information center 5000 reads the history information with respect to each user, from the probe information 503 (S3102), and then, deletes the information that is not significant for creating the statistical traffic information. For example, since the information collected while the parking brake is on, can be determined as information collected while the vehicle was parked, such information is deleted from the probe information 503.

Next, conditions for collecting the history information (date and time, weather, and link ID) are obtained (S3106), and the history information is classified according to the collecting conditions (S3108). It is to be noted that the weather is specified according to a length of time period of wipers ON/OFF, past weather record history which was collected in advance, and the like.

When the above processes (S3102 to S3108) are completed with respect to all the user's history information (S3110), the operating unit 901 finishes the classifying process to classify the probe information 503, and shifts the process to the manipulating process (S320) to manipulate thus classified probe information.

Figure 17:
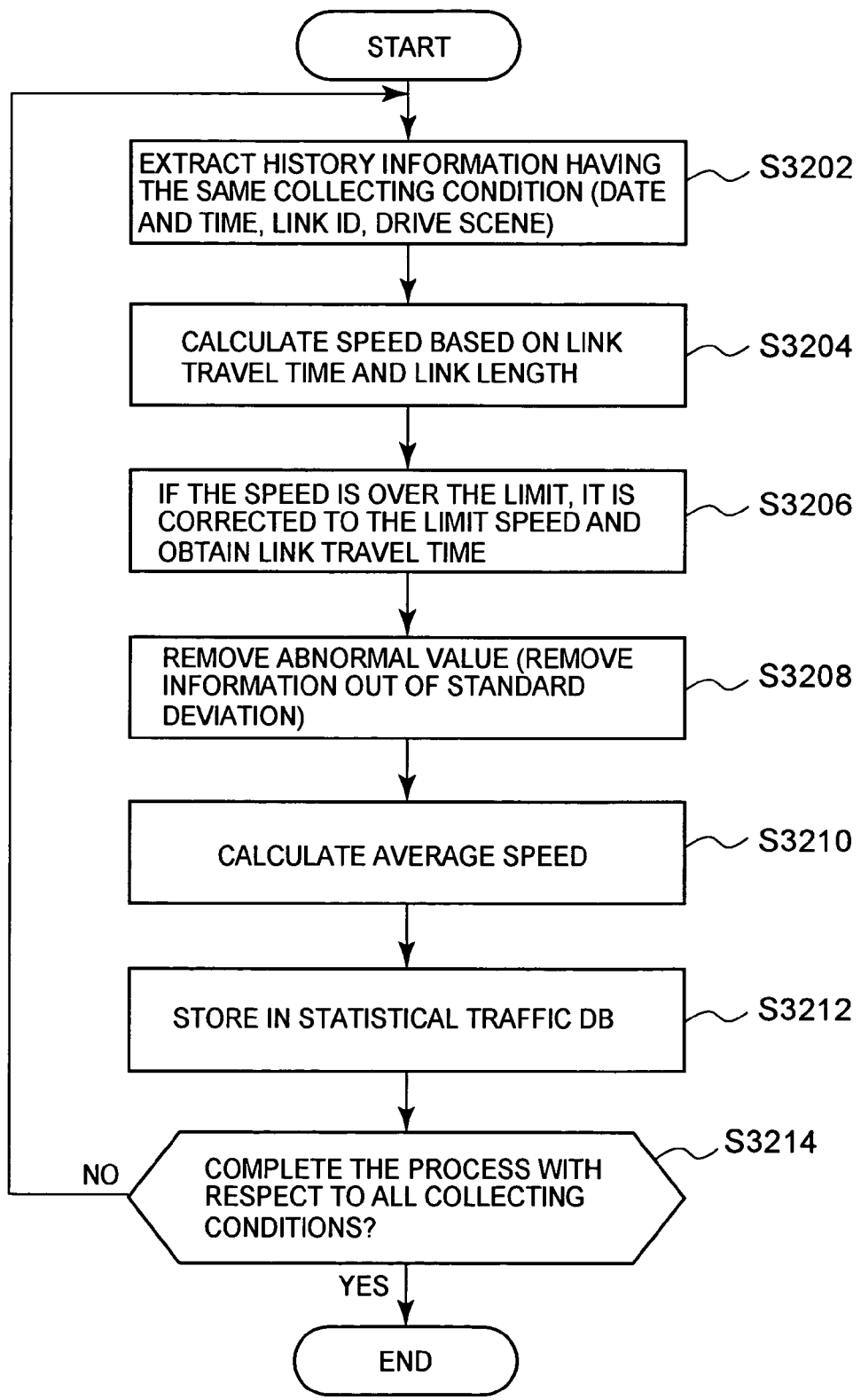
FIG. 17 is a flow diagram showing a flow of the process in S320 (manipulation of probe information having been classified) as shown in FIG. 15.

FIG. 17 is a flow diagram which shows a flow of the manipulating process (S320) to manipulate the classified probe information.

The operation unit 901 extracts information under the same collecting condition (date and time, weather, link ID), from the probe information being classified (S3202). Next, the operation unit 901 obtains the link travel time with respect to each information item having been extracted. For example, since the drive history information 3310 includes the drive history information recorded every time going over a link 3312, it is possible to obtain the link travel time from the point of time when going over the link. Then, the operation unit 901 calculates a moving speed from the link travel time thus obtained and the length of the link (link length) (S3204). If the drive history information 3312 includes the link travel time, this processing can be omitted.

Furthermore, the operation unit 901 determines whether or not thus obtained moving speed goes over a limit speed, and if it is over, the link travel time is recalculated using the limit speed as moving speed of the link. Then, data out of standard deviation is removed from the link travel time being obtained (S3208). An average value is obtained from the remaining link travel time, and this value is assumed as a statistic score of the link travel time (S3210). Then, it is stored in the statistical traffic information 504 in such a manner as being associated with the collection conditions (date and time, weather, link ID) (S3212).

When the above procedure is completed with respect to all the collecting conditions, the operation unit 901 in the information center 5000 finishes the statistical traffic information creating process.

With the descriptions above, a processing to create the statistical traffic information 504 from the probe information 503 has been explained.

The statistical traffic information as thus created is transmitted to the in-vehicle type navigation device 1000 via the network, in response to a request from the in-vehicle type navigation device 1000. Alternatively, it may be recorded in the data recording medium 800 by the reader/writer 904 in the terminal machine 5030. It is further possible to rewrite the statistical traffic information recorded in the data recording medium 800 with the latest statistical traffic information, as in the case of rewriting the map data. In other words, with reference to FIG. 13, a process to update the map data has been explained, but updating of the statistical traffic information is also possible instead of updating the map data. Alternatively, updating of the map data and updating of the statistical traffic information may be carried out simultaneously. Even in the case above, it is possible to change the update charge according to the recording ratio of the history information.

Here, route searching will be explained, which utilizes the statistical traffic information of the in-vehicle type navigation device 1000.

As described above, the statistical traffic information includes link travel time with respect to each collecting condition. Therefore, when the route searching section 42 of the in-vehicle type navigation device 1000 accepts a route search request, it makes a search for a route which minimizes the total cost from the departure place to the destination by the use of the Dijkstra method or the like, assuming the link travel time as a cost. In performing this search, the route searching section 42 calculates the date and time when reaching each link, and further obtains weather forecasting around the link on that date and time. Then, the route searching section 42 extracts from the statistical traffic information, a link travel time under the collecting condition that matches that date and time, and weather. Thereafter, thus extracted data is set as a cost of the link. With the procedure above, it is possible to make a search for an appropriate recommended route, which is better grounded in the reality, compared to the case where searching is made by the use of a link travel time that is uniformly defined according to the link length and road width.

One embodiment to which the present invention is applied has been explained so far.

According to the embodiment as described above, information which the information center wants to collect (history information) and information which the user wants to obtain (the latest map data or statistical traffic information) are recorded on the same recording medium. The user allows a situation where the information center accesses the recording medium, so as to obtain desired information. The information center utilizes that opportunity to read and collect desired information from the recording medium.

Furthermore, since the update charge of the map data is calculated according to the recording ratio of the history information, it is possible to prompt the user to accumulate the history information in the data recording medium.

Furthermore, as the history information, there are recorded information items such as drive date and time, link travel time, blinker ON/OFF, parking brake ON/OFF, and wipers ON/OFF. Therefore, more detailed drive history can be collected.

It is to be noted that the present invention is not limited to the above embodiment, but various modifications are available within the scope the invention.

For example, the history information processor 55 in the in-vehicle navigation device 1000 may use encryption in recording the history information 330 in the data recording medium 800. With the configuration above, it is possible to prevent the history information 330 from being read by anyone else. The encryption may be carried out using asymmetric cipher, which utilizes a public key and a private key. In S114 of FIG. 12, the history information processor 55 encrypts the history information 300 by using a public key given from the information center 5000 in advance, before recording the history information in the data recording medium. Then, the encrypted data is recorded in the data recording medium 800. The private key is configured to be held by the information center 5000. Then, in S208 of FIG. 13, after the operation unit 901 in the information center 5000 receives the history information 330 being encrypted, it is decrypted by the private key held in itself, and original history information is obtained. As thus described, since encryption and decryption are performed by different keys, confidentiality of the history information is improved.

In the above embodiment, updating of map data, or sending/receiving the history information is performed by removing the data recording medium 800 from the in-vehicle type navigation device 1000. It is not limited to the procedure above, and the information may be sent and received via a communication cable, without removing the data recording medium 800. Specifically, the in-vehicle type navigation device 1000 is connectable with the terminal machine 5030 via the communication cable. Then, sending and receiving the history information are performed by the communication cable. The latest map data is received from the terminal machine 5030 via the communication cable.

In the above embodiment, sending and receiving of the history information 330 between the data recording medium 800 and the information center 5000, and rewriting of the map data are performed via the terminal machine 5030. Not limited to the above procedure, it may be performed via a network. For example, when accepting an update request from the user for updating the map data 310, the user operation analyzer 41 of the in-vehicle type navigation device 1000 logs on to the information center 5000. In receipt of this logon, the operation unit 901 of the information center 5000 performs the processing flow that is shown in FIG. 13 against the in-vehicle type navigation device 1000, instead of the terminal machine 5030. That is, in the situation above, the user operation analyzer 41 of the in-vehicle type navigation device 1000 performs operations that are similar to the operations performed by the operation unit 901 of the terminal machine 5030. Also in the embodiment as such, the information center 5000 is capable of implementing a way to obtain the history information, in exchange for updating the map data of the data recording medium 800.

Second Embodiment

The second embodiment will be explained next. Since the second embodiment has a configuration similar to that of the first embodiment, tedious explanations will not be made as to the configuration being common.

Figure 18:
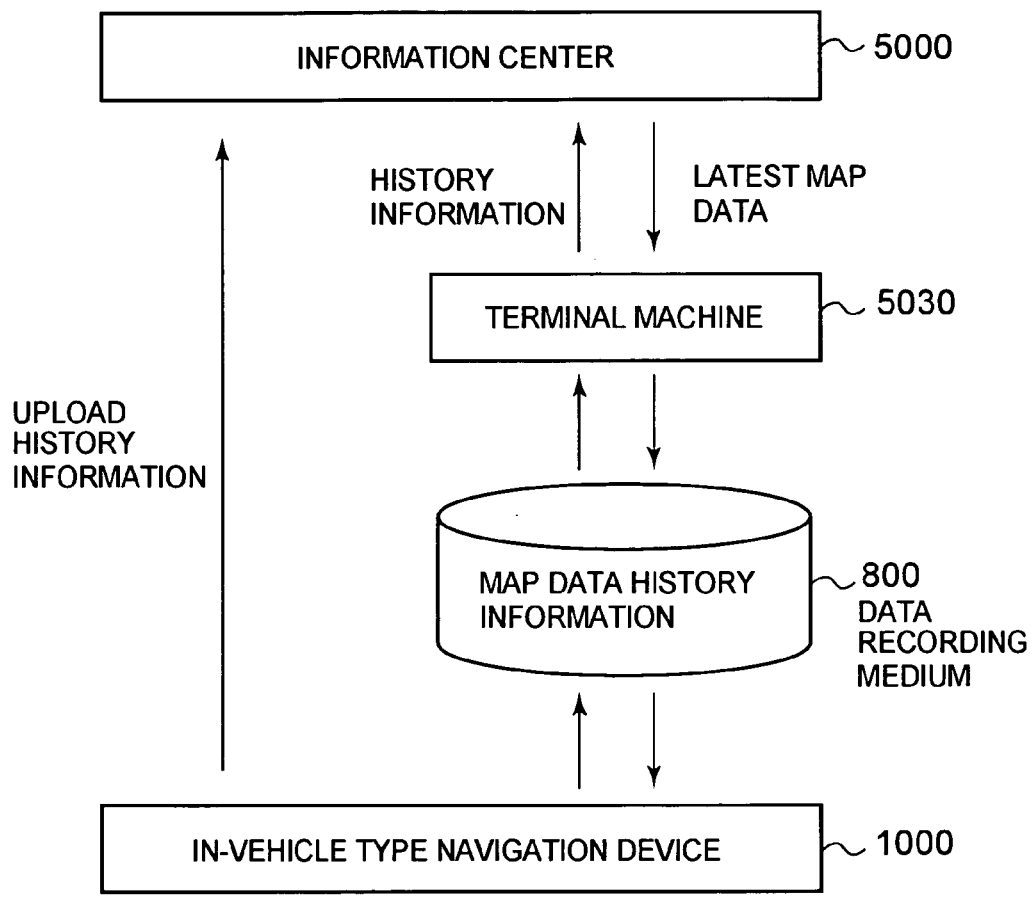
FIG. 18 is a schematic diagram of the traffic information collecting system according to the second embodiment.

FIG. 18 is a schematic diagram of the traffic information collecting system according to the second embodiment.

In the present embodiment, it is considered that history information is passed from the in-vehicle type navigation device 1000 to the information center 500, through multiple ways. Here, explanations will be made for the case where there are two ways (S400). One way is to pass the history information, by using telematics, and the like. Another way is to pass the history information, via the terminal machine 5030 that is installed at a car dealer and the like (S500). In the former, mainly recent history information as a part of the accumulated history information is uploaded in the information center 5000. In the latter, the entire history information stored in the data recording medium 800 is considered to be a target to be passed to the information center 5000.

The information center 5000 holds in its own storage unit, current traffic information, traffic-jam forecasting information, and the like. The in-vehicle type navigation device 1000 accesses the information center 5000, periodically, in response to a user's request, or when traffic information is necessary in searching a route. In order to response to the request from the in-vehicle type navigation device 1000, the information center 5000 transmits current traffic information and traffic jam forecasting information, and the like, to the in-vehicle type navigation device 1000. With the procedure above, the in-vehicle type navigation device 1000 obtains the current traffic information and traffic jam forecasting information. At this timing, the in-vehicle type navigation device 1000 transmits a part of the history information to the information center 5000, utilizing the opportunity being accessing the information center 5000. Alternatively, the information center 5000 requests the in-vehicle type navigation device 1000 to transmit the history information. Then, the in-vehicle type navigation device 1000 transmits the history information thus requested to the information center 5000, in order to response to the request.

On the other hand, the information center 5000 obtains history information held by the in-vehicle type navigation device 1000 also via the terminal machine 5030.

When obtaining the history information through two ways as such, there is a possibility that the information center 5000 obtains information overlapping already-obtained information.

Considering this situation, in the present embodiment, an identifier is attached to the information already transmitted to the information center 5000, thereby handling redundant information.

A traffic information collecting system according to the present embodiment is specifically configured as the following.

Figure 19:
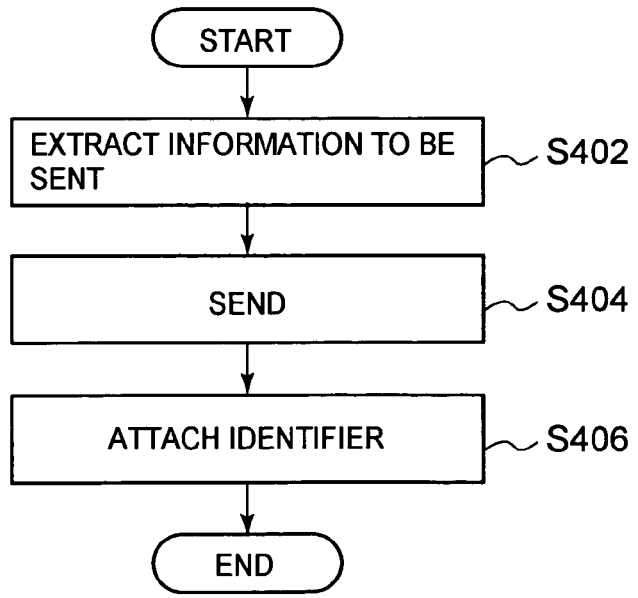
FIG. 19 is a flow diagram of a process in which the in-vehicle type navigation device transmits history information to the information center, in the traffic information collecting system according to the second embodiment.

FIG. 19 shows a flow of processing in which the in-vehicle type navigation device 1000 utilizes an opportunity accessing the information center 5000 for obtaining the traffic information, so as to transmit the history information 330 accumulated in the data recording medium 800 to the information center 5000 (S400).

Firstly, the history information processor 55 of the in-vehicle type navigation device 1000 extracts information to be transmitted to the information center 5000 (S402). The information to be transmitted is, for example, recent drive history information 3310, which is at a point a predetermined time before the current point of time (e.g. two hours before). It is possible to obtain whether or not the drive history information 3310 is within the predetermined period of time before the current point of time, based on the date and time 33111 when the drive history information was measured, and link entering date and time 33121. In addition, it is possible to predefine which history information is transmitted to the information center 5000. Alternatively, the information center 5000 may determine which history information is to be transmitted and make a request to the in-vehicle type navigation device 1000.

When an identifier is attached to the history information, indicating that it has already been transmitted, the history information processor 55 excludes the history information from a target to be transmitted to the information center 5000.

FIG. 20 shows a configuration example of the history information to be transmitted. As illustrated, in this particular example, measured date and time 33111a, position 33112a, and link ID 33113a of the drive history information 3311 every certain period of time, are targets to be transmitted.

Next, the history information processor 55 of the in-vehicle type navigation device 1000 transmits the information extracted in S402 to the information center 5000 (S404). At this timing, this transmission may be performed after the history information to be transmitted is compressed, such as extracting a difference.

In addition, the history information processor 55 attaches an identifier to the information that has been transmitted to the information center 5000, out of the information in the data recording medium 800. This identifier indicates that the history information having this identifier has already been transmitted to the information center 5000.

FIG. 21 shows that a field for the identifier is added with respect to each record stored in the drive history information 3311, which is stored in the data recording medium 800, and shows a status that identifiers are attached to the records of the information corresponding to the information having been transmitted to the information center 5000.

A step for attaching the identifier may be performed prior to transmitting the history information to the information center 5000.

With the procedure above, the in-vehicle type navigation device 1000 transmits to the information center 5000 the recent history information at the time whenever the opportunity arises.

The information center 5000 accumulates thus received history information in its own storage unit. Then, utilizing the recent history information items at the time, received from several in-vehicle type navigation devices, current traffic information and traffic information on forecast are created.

Next, a case will be explained, in which the information center 5000 obtains history information of the in-vehicle type navigation device via the terminal machine 5030 (S500).

FIG. 20 shows a flow of processing performed by the information center 500 in the case above.

As explained in the case of the first embodiment, when the operation unit 901 of the information center 5000 obtains the history information stored in the data recording medium 800 via the terminal machine 5030, the operation unit selects history information by record (for example, by measured date and time 33111) (S502).

Next, the operation unit 901 determines whether or not an identifier is attached to the information, indicating that it has already been transmitted to the information center 5000 (S504). When the identifier is attached (Yes in S504), the operation unit 901 searches the history information already stored, for information corresponding to that information with the identifier. Then, the operation unit 901 deletes the already stored information thus searched out from the storage unit (S506). Already stored information is deleted as such, because the history information obtained from the data recording medium 800 via the terminal machine 5030 includes more detailed information.

On the other hand, if an identifier is not attached (No in S504), the processing unit 5030 just shifts the process to S508.

In S508, the operation unit 901 determines whether or not checking as to existence or non-existence of identifier has been performed with respect to all the history information, and if not all the information is not checked, the processing returns to S502, and processing continues. On the other hand, if all the information has been checked, the processing is completed.

Processes in the in-vehicle type navigation device 1000 and the information center 5000 have been explained so far, in the case where the history information is collected into the information center 5000 via two paths.

According to those processes, the information center 5000 is capable of manipulating the history information items appropriately, which were redundantly obtained.

In addition, in S506, the redundant information is deleted, but alternatively, it is also possible that it is not deleted and not used for a processing for generating traffic information.

In addition, it is further possible that the history information processor 55 of the in-vehicle type navigation device 1000 may erase from the data recording medium 800, the information being recorded therein, corresponding to the information having been transmitted to the information center 5000. With this erasing, it is possible to prevent a situation where the information center 5000 obtains redundant information.

There have been explained examples in which the present invention is applied to an in-vehicle type navigation device. However, the present invention may be applied to a navigation device which is not intended to be used in a vehicle.

What is claimed is:

1. A system comprising an information center device, a terminal machine connected to said information center device, and a navigation device which is mountable on a moving object, wherein, said navigation device comprises, a recording medium being rewritable on which map data is recordable, and a drive information collecting unit adapted to collect drive information of said moving object, a sorting unit adapted to sort whether or not the information having been collected by said drive information collecting unit is authorized to be recorded in said recording medium, a history information recording unit adapted to record the drive information having been sorted to be recorded by said sorting unit as drive history information in said recording medium, a recording ratio calculating unit adapted to calculate a recording ratio based on the drive information having been collected by said drive information collecting unit and the drive information having been recorded by said history information recording unit, and a recording ratio recording unit adapted to record said recording ratio into said recording medium, and said terminal machine comprises, a unit adapted to read out said drive history information and said recording ratio from said recording medium, and to send said drive history information and said recording ratio to said information center, and display an update charge of said map data received from said information center device, and map updating unit adapted to record the map data received from said information center device, in a recording medium prepared for said navigation device, and said information center device comprises, a storage unit which stores map data, a sending unit adapted to send said map data to said terminal machine, a receiving unit adapted to receive said drive history information and said recording ratio from said terminal machine, and a unit adapted to calculate an update charge of said map data according to said recording ration, and to send the update charge of map data to said terminal machine.

2. A system comprising an information center device, a terminal machine connected to said information center device, and a navigation device which is mountable on a moving object, wherein, said navigation device comprises, a recording medium being rewritable on which map data is recordable, a history information recording unit adapted to record drive history information of said moving object in said recording medium, and a recording ratio recording unit adapted to calculate a recording ratio of said drive history information at least by using the number of all information items as predetermined recording target and the number of information items excluding the information items which are not subject to recording according to user's directive, and record the recording ratio in said recording medium, and said terminal machine comprises, an unit adapted to read out said drive history information and said recording ratio from said recording medium and to send said drive history information and said recording ratio to said information center, and display an update charge of the map data received from said information center device, and a map updating unit adapted to record the map data received from said information center device, in a recording medium prepared for said navigation device, and said information center device comprises, a storage unit which stores map data, a sending unit adapted to send said map data to said terminal machine, a receiving unit adapted to receive said drive history information from said terminal machine, and an unit adapted to calculate an update charge of said map data according to said recording ratio and to send the update charge of map data to said terminal machine.

3. A navigation device which is mountable on a moving object and used in a system which includes navigation device having a recording medium which stores map data, an information center device which records map data, and a terminal machine which receives said map data by connecting to said information center device and updates the map data of the recording medium of said navigation device by using received map data, the navigation device comprising;

a drive information collecting unit collecting drive information for a plurality of historical drive events of said moving object, where plural predetermined types of data are collected for each event of the plurality of historical drive events, a sorting unit for sorting which of the plural predetermined types of data of the information having been collected by said drive information collecting unit is authorized by a user of the navigation device, to be recorded in said recording medium, a history information recording unit recording the drive information having been sorted to be recorded by said sorting unit as drive history information in said recording medium, a recording ratio calculating unit mathematically using both the drive information having been collected by said drive information collecting unit and the drive information having been recorded by said history information recording unit, to calculate a recording ratio, and a recording ratio recording unit recording said recording ratio in said recording medium.

4. A navigation device which is mountable on a moving object and used in a system which includes a navigation device having a recording medium which stores map data, an information center device which records map data, and a terminal machine which receives said map data by connecting to said information center device and updates the map data of the recording medium of said navigation device by using received map data, the navigation device comprising;

a history information recording unit recording, in said recording medium, only pre-selected types of plural predetermined types of drive history information for a plurality of historical drive events of said moving objects, where the plural predetermined types of drive history information are collected for each event of the plurality of historical drive events, and where the pre-selected types which are recorded are selected by a user's directive, a recording ratio calculating unit mathematically using both: a number of all the plural predetermined types of the drive history information collected as a predetermined recording target; and a number of non-pre-selected types of the drive history information which are excluded as not subject to recording according to user's directive, to calculate a recording ratio useable for discounting a charge imposed on a user, and a recording ratio recording unit adapted to record said recording ratio in said recording medium.

5. A system comprising a navigation device having a recording medium which stores map data, an information center device which records map data, and a terminal machine which receives said map data by connecting to said information center device and updates the map data of the recording medium of said navigation device by using received map data, wherein, said navigation device comprises, a history information recording unit adapted to record drive history information of said moving object in said recording medium, a sending unit adapted to connect to said information center device and to send said drive history information to the information center device, and a recording unit adapted to record in said recording medium, sending identification information which distinguishes between the drive history information having already been sent to said information center device and the drive history information having not been sent thereto yet, and said terminal machine comprises, an unit adapted to read out said drive history information from said recording medium and to send said drive history information to said information center, and a map updating unit adapted to record the map data received from said information center device, in a recording medium prepared for said navigation device, and said information center device comprises, a sending unit adapted to send said map data to said terminal machine, a receiving unit adapted to receive said drive history information, when connected to said terminal machine, from the terminal machine, and an information selecting unit in which, when said information center device receives from said terminal machine, the drive history information with identification information being attached indicating that the information has already been sent, the information center device erases any one of such drive history information as being overlapping drive history information.

6. The system according to claim 5, wherein, said information selecting unit is adapted to erase drive history information sent by the sending unit of said navigation device among said overlapping drive history information.

* * * * *